(12) United States Patent
Bluestone et al.

(10) Patent No.: US 12,068,802 B1
(45) Date of Patent: Aug. 20, 2024

(54) ALL-DIGITAL CROSS-CHANNEL COUPLING MEASUREMENT

(71) Applicant: The Boeing Company, Arlington, VA (US)

(72) Inventors: Aaron James Bluestone, Camarillo, CA (US); Rodney Franklyn Sinclair, Thousand Oaks, CA (US)

(73) Assignee: THE BOEING COMPANY, Arlington, VA (US)

( * ) Notice: Subject to any disclaimer, the term of this patent is extended or adjusted under 35 U.S.C. 154(b) by 10 days.

(21) Appl. No.: 18/182,963

(22) Filed: Mar. 13, 2023

(51) Int. Cl.
*H04B 3/46* (2015.01)
*H04B 3/487* (2015.01)

(52) U.S. Cl.
CPC .................................. *H04B 3/487* (2015.01)

(58) Field of Classification Search
CPC .. G06F 30/367; G06F 11/221; G06F 2119/10; H04B 17/309; H04B 3/32; H04B 3/487; H04B 1/0475; H04L 25/4971; H04L 1/242; H04L 43/50
USPC ....................................................... 375/223
See application file for complete search history.

(56) References Cited

U.S. PATENT DOCUMENTS

| 11,744,006 B2 * | 8/2023 | Wang .................. | H01L 23/5283 |
| | | | 174/261 |
| 2012/0072153 A1* | 3/2012 | Liaw ................ | G11C 29/50012 |
| | | | 702/79 |
| 2013/0207725 A1* | 8/2013 | Afshari .................... | H03G 3/00 |
| | | | 330/144 |
| 2020/0067568 A1* | 2/2020 | Spirkl ................. | H04L 25/4917 |

OTHER PUBLICATIONS

Peterson et al., "Error-Correcting Codes, Chapter 6.7 Structure of Finite Fields—Summary," The Massachusetts Institute of Technology (MIT) 1972, p. 161.
Sinclair, "All-Digital Cross-Channel Coupling Measurement Technique," HRL Laboratories, LLC paper, Dec. 17, 2020, 18 pages.
Wapole et al., "Chapter 11: Simple Linear Regression and Correlation," from the book entitled Probability & Statistics for Engineers & Scientists, Ninth Edition (2012, 2007, 2002) Pearson Education, Inc., pp. 389-442.

* cited by examiner

*Primary Examiner* — Khai Tran
(74) *Attorney, Agent, or Firm* — MH2 Technology Law Group LLP

(57) ABSTRACT

A method for determining mutual coupling between adjacent communication transmission lines is disclosed. The method includes providing a first periodic signal to a first communication transmit end of a first communication transmission line; providing a second periodic signal to a second communication transmit end of a second communication transmission line, wherein the first communication transmission line is adjacent to the second communication transmission line; measuring a time of zero-crossing at a second communication receive end of the second communication transmission line compared with a zero-crossing of an ideal reference signal; and determining a mutual coupling level based on the time of zero-crossing on the second communication transmission line compared with a zero-crossing of an ideal reference signal that was measured.

20 Claims, 28 Drawing Sheets

```
`timescale 1ns/1ps module sim #(
    parameter N_GATES = 5
);

initial $timeformat (-9, 3, "", 6);

bit [0:N_GATES-1] state = { 1'b0, {(N_GATES/2){2'b10}} };
not #0.25 ns[0:N_GATES-1] (state, { state[N_GATES-1], state[0:N_GATES-2] });
always @ (state)
    $display("%t : %b", $realtime, state);

initial #3 $finish;

initial begin
    $dumpfile("sim.vcd");
    $dumpvars(state);
end endmodule : sim
```

FIG. 16

```
`timescale 1ns/1ps
module sim_fpga #(
    parameter N_GATES = 8
);
initial $timeformat (-9, 3, "", 6);

bit resetn = 1'b0;
initial #3.0 resetn = 1'b1;

bit [0:N_GATES-1] state = 'h1234567;
and #0.25 gate0(state[0], resetn, ~state[N_GATES-1]);
or #0.25 gate[1:N_GATES-1] (state[1:N_GATES-1], state[0:N_GATES-2]);

localparam NBITS_N_GATES = $clog2(N_GATES);
logic [NBITS_N_GATES:0] phase;
integer ix;
always @ (state)
    for (ix=0; ix<N_GATES; ++ix)
        if (state[ix] == state[0])
            phase = { ~state[0], ix[NBITS_N_GATES-1:0] };

always @ (state)
    $display("%t : %b %d", $realtime, state, phase);

initial #8 $finish;

initial begin
    $dumpfile("sim_fpga.vcd");
    $dumpvars();
end endmodule : sim_fpga
```

FIG. 17

```
(* DONT_TOUCH = "TRUE" *) wire [N_STAGES-1:0] stage;

// stage[N_STAGES-1], resetb   output
//          0, 0                0       (in reset)
//          0, 1                1       (invert 0 to 1)
//          1, 0                0       (in reset)
//          1, 1                0       (invert 1 to 0)
(* DONT_TOUCH = "TRUE" *) LUT2 #(
    .INIT    (4'b0010)
) stage_0_inst (
    .I0  (resetb),
    .I1  (stage[N_STAGES-1]),
    .O   (stage[0])
);

genvar ix_stage;
generate
    for (ix_stage=1; ix_stage<N_STAGES; ix_stage=ix_stage+1) begin : gen_stage (* DONT_TOUCH = "TRUE" *) LUT1 #(
            .INIT   (2'b10)    // 0 ==> 0, 1 ==> 1
        ) lut1_inst (
            .I0   (stage[ix_stage-1]),
            .O    (stage[ix_stage])
        );

end
endgenerate
```

FIG. 19

```
set route_up{ CLBLL_LL_A CLBLL_LOGIC_OUTS12 { BYP_ALT0 BYP_L0 CLBLL_L_AX } { NN2BEG0 IMUX_L8 CLBLL_LL_A5 }
NE2BEG0 BYP_ALT0 { BYP0 CLBLL_L_AX } BYP_BOUNCE0 BYP_ALT1 BYP1 CLBLL_LL_AX }
set route_top{ CLBLL_LL_A CLBLL_LOGIC_OUTS12 { BYP_ALT0 BYP_L0 CLBLL_L_AX } { NR1BEG0 IMUX_L8 CLBLL_LL_A5 }
NE2BEG0 BYP_ALT0 { BYP0 CLBLL_L_AX } BYP_BOUNCE0 BYP_ALT1 BYP1 CLBLL_LL_AX }
set route_dwn{ CLBLL_LL_A CLBLL_LOGIC_OUTS12 { BYP_ALT0 BYP_L0 CLBLL_L_AX } { SL1BEG0 SR1BEG1 IMUX_L4 CLBLL_LL_A6 }
NE2BEG0 BYP_ALT0 { BYP0 CLBLL_L_AX } BYP_BOUNCE0 BYP_ALT1 BYP1 CLBLL_LL_AX }
set route_btm{ CLBLL_LL_A CLBLL_LOGIC_OUTS12 { BYP_ALT0 BYP_L0 CLBLL_L_AX } { SL1BEG0 IMUX_L8 CLBLL_LL_A5 }
NE2BEG0 BYP_ALT0 { BYP0 CLBLL_L_AX } BYP_BOUNCE0 BYP_ALT1 BYP1 CLBLL_LL_AX }
opt_design
place_design
for {set ix 0} {$ix < 16} {incr ix} {
    if {$ix < 7} {
        set route "${route_up}"
    } elseif {$ix == 7} {
        set route "${route_top}"
    } elseif {$ix < 15} {
        set route "${route_dwn}"
    } else {
        set route "${route_btm}"
    }
    set_property -dict [subst { ROUTE "${route}" IS_ROUTE_FIXED "TRUE" }] [get_nets "ro_inst/stage[${ix}]"]
}
place_design -unplace
place_design
route_design
```

FIG. 26

ALL-DIGITAL CROSS-CHANNEL COUPLING MEASUREMENT

FIELD OF THE DISCLOSURE

The present disclosure relates to cross-channel coupling measurements, and in particular, to systems, devices, and method for measuring cross-channel coupling in situ using all-digital measurements.

BACKGROUND

Mutual coupling/cross talk measurements are usually done with expensive test equipment that requires disconnecting signal wires from a system transmitter and receiver and connecting them to test equipment instead, and then reconnecting them back into the system. This approach tends to have many disadvantages including being both inefficient and time consuming. Accordingly, an improved approach to measure mutual coupling/cross talk is needed.

SUMMARY

In accordance with examples of the present disclosure, a method for determining mutual coupling between adjacent communication transmission lines is disclosed. The method comprises providing a first periodic signal to a first communication transmit end of a first communication transmission line; providing a second periodic signal to a second communication transmit end of a second communication transmission line, wherein the first communication transmission line is adjacent to the second communication transmission line; measuring a time of zero-crossing at a second communication receive end of the second communication transmission line compared with a zero-crossing of an ideal reference signal; and determining a mutual coupling level based on the time of zero-crossing on the second communication transmission line compared with a zero-crossing of an ideal reference signal that was measured.

Various additional features can be included in the method including one or more of the of the following features. The first communication transmission line is an aggressor line. The second communication transmission line is a victim line. The first periodic signal is a pseudo-random noise signal. The first periodic signal is provided using a digital buffer. The first communication transmission line is separated from the second communication transmission line by about 1 micron to about 1 millimeter. The second periodic signal is a clock signal or a square wave.

In accordance with examples of the present disclosure, a computer system is disclosed. The computer system comprises a hardware processor; a non-transitory computer readable medium that stores instructions that when executed by the hardware processor perform a method for determining mutual coupling between adjacent communication transmission lines, the method comprising: providing a first periodic signal to a first communication transmit end of a first communication transmission line; providing a second periodic signal to a second communication transmit end of a second communication transmission line, wherein the first communication transmission line is adjacent to the second communication transmission line; measuring a time of zero-crossing at a second communication receive end of the second communication transmission line compared with a zero-crossing of an ideal reference signal; and determining a mutual coupling level based on the time of zero-crossing on the second communication transmission line compared with a zero-crossing of an ideal reference signal that was measured.

Various additional features can be included in the computer system including one or more of the of the following features. The first communication transmission line is an aggressor line. The second communication transmission line is a victim line. The first periodic signal is a pseudo-random noise signal. The first periodic signal is provided using a digital buffer. The first communication transmission line is separated from the second communication transmission line by about 1 micron to about 1 millimeter. The second periodic signal is a clock signal or a square wave.

In accordance with examples of the present disclosure, a non-transitory computer readable medium is disclosed that stores instructions that when executed by a hardware processor perform a method for determining mutual coupling between adjacent communication transmission lines, the method comprising: providing a first periodic signal to a first communication transmit end of a first communication transmission line; providing a second periodic signal to a second communication transmit end of a second communication transmission line, wherein the first communication transmission line is adjacent to the second communication transmission line; measuring a time of zero-crossing at a second communication receive end of the second communication transmission line compared with a zero-crossing of an ideal reference signal; and determining a mutual coupling level based on the time of zero-crossing on the second communication transmission line compared with a zero-crossing of an ideal reference signal that was measured.

Various additional features can be included in the non-transitory computer readable medium including one or more of the of the following features. The first communication transmission line is an aggressor line. The second communication transmission line is a victim line. The first periodic signal is a pseudo-random noise signal. The first periodic signal is provided using a digital buffer. The first communication transmission line is separated from the second communication transmission line by about 1 micron to about 1 millimeter. The second periodic signal is a clock signal or a square wave.

BRIEF DESCRIPTION OF THE DRAWINGS

FIG. 16 shows sample code for a ring oscillator according to examples of the present disclosure.

FIG. 17 shows code for a simulated FPGA design according to examples of the present disclosure.

FIG. 19 shows code for a simulated Xilinx FPGA design according to examples of the present disclosure.

FIG. 26 shows a TCL script that ensures consistent ring-oscillator routing in the Xilinx FPGA according to examples of the present disclosure.

DETAILED DESCRIPTION

Figure 1:
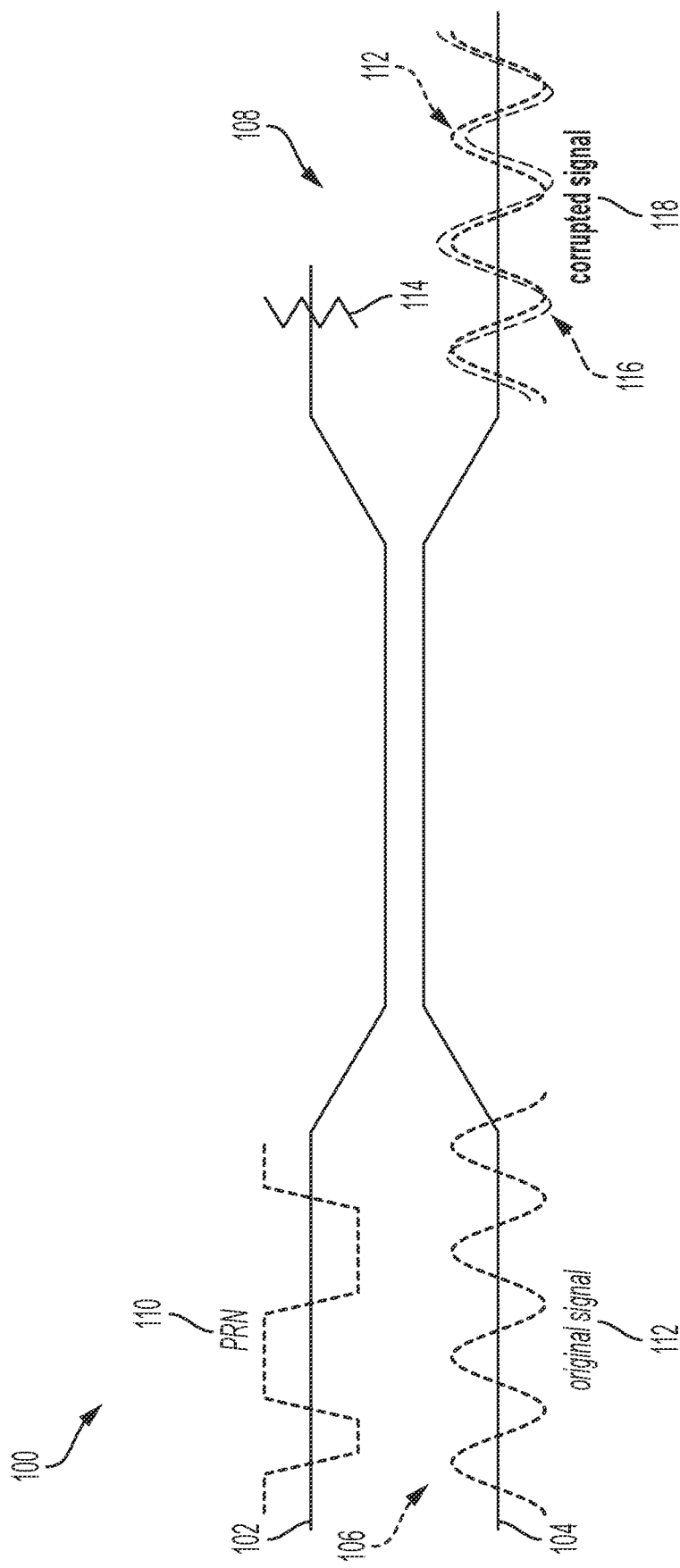
FIG. 1 shows an arrangement of signals propagating on adjacent communication lines where mutual coupling is measured according to examples of the present disclosure.

Generally speaking, examples of the present disclosure describe methods, devices, and systems to measure inter-channel coupling between assembled, high-speed, digital communications channels using a small, inexpensive circuit at the receiver that measures modulation of zero-crossings of the received signal caused by signals coupling into the channel. In some examples, if the coupled signals are PRN modulated and a coarse, noisy measurement of the zero-crossing is performed by a digital Time Measurement Circuit (TMC), then a digital correlation of the zero-crossing times and the PRN modulation sequence is linearly related to the mutual coupling between the two channels. In some examples, a system or device can be configured to perform a method to measure the mutual coupling from an error channel to a signal channel by correlating a waveform, such as a PRN waveform, for example, transmitted on the error channel to zero-crossing time offsets induced on the signal channel. The zero-crossing times of a symmetric periodic signal, such as a sine wave or a band-limited square wave, on a communication channel can be modulated by Pseudo Random Noise (PRN) signals coupled from adjacent or nearby channels. These zero-crossing times are correlated against the PRN for multiple cycles of the PRN. The resulting correlation is a measurement of the inter-channel coupling. The zero-crossing times are measured using simple digital circuits such as a ring oscillator phase or some kind of delay measurement circuit. The PRN correlation comprises of an accumulator where the measured zero-crossing time is added to or subtracted from the accumulator based on the PRN bit being correlated and whether the signal edge is rising or falling. The final accumulation is scaled offline by the resolution of the zero-crossing measurement circuit, the number of integration steps, and the magnitude of the signal edge slope to produce the scalar coupling magnitude.

Examples of the present disclosure provide for the following advantages. The circuit at the receiver is small and simple enough to be incorporated into the receiver circuit. The circuit at the receiver can measure the in-situ mutual coupling between communication channels. The system performance can be monitored over time via "calibration" commands and without manipulating hardware to perform the measurements. Conventionally, mutual coupling measurements are usually done with expensive test equipment that requires disconnecting the signal wires from the system transmitter and receiver can connecting them to test equipment instead, and then reconnecting them back into the system. According to examples of the present disclosure, the tests are performed without manipulating the system hardware assembly. Normally, degradations in hardware, whether due to aging or physical damage, are identified by visual inspection or by connecting to and from test equipment. Examples of the present disclosure allow for degradation to be monitored on-demand without the time and cost of human-centered inspections and test equipment operation. Examples of the present disclosure can be used in numerous applications including, but are not limited to, high-speed digital communication link chips, systems using Peripheral Component Interconnect Express (PCIe), Gigabit Ethernet, Mobile Industry Processor Interface (MIPI), Field-Programmable Gate Array (FPGA) transceivers, serial rapid input (I)/output (O), and test equipment for these high-speed digital communication links.

FIG. 1 shows an arrangement 100 of signals propagating on adjacent communication lines where mutual coupling is measured according to examples of the present disclosure. First periodic waveform 110 (or first periodic signal), such as a PRN waveform, is provided onto first communication transmission line 102, also and second periodic waveform 112 (or second periodic signal) (original or nominal signal) is provided onto second communication transmission line 104 at transmit end 106. The communication line on which the PRN waveform is provided is sometimes called an aggressor line and the communication line on which the original or nominal signal is sometimes called a victim line. In the example of FIG. 1, first communication transmission line 102 is the aggressor line and second communication transmission line 104 is the victim line. In some examples, first communication transmission line 102 and second communication transmission line 104 are separated by a distance that ranges from the scale of microns to the scale of millimeters. At receive end 108, first periodic waveform 110 is shunted by shunt 114 and second periodic waveform 112 is modulated by first periodic waveform 110 resulting in corrupted signal 118.

Figure 2:
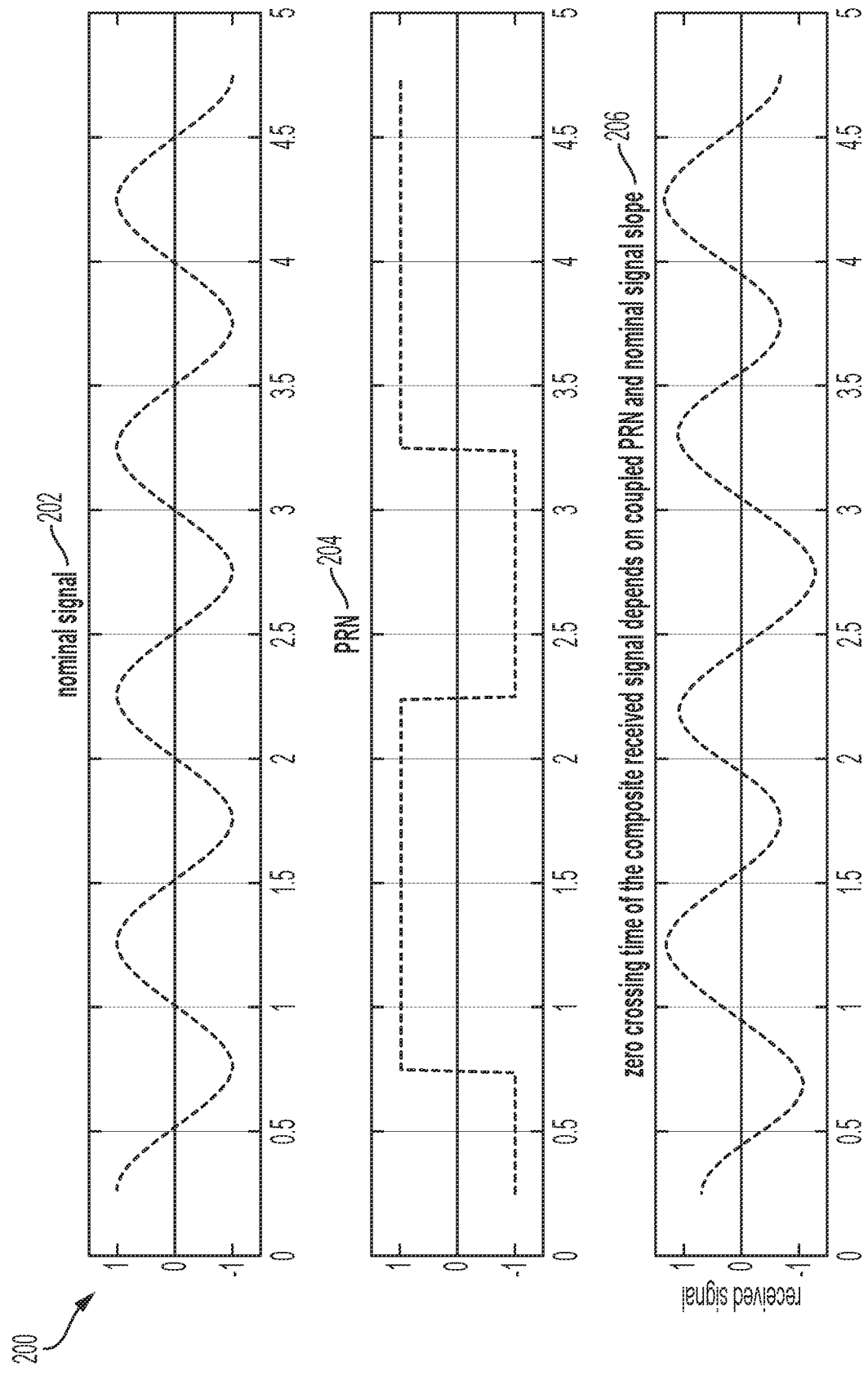
FIG. 2 shows another arrangement of signals propagating on adjacent communication lines where mutual coupling is measured according to examples of the present disclosure.

FIG. 2 shows another arrangement 200 of signals propagating on adjacent communication lines where mutual coupling is measured according to examples of the present disclosure. For example, first periodic waveform (original or nominal signal) 202 is provided onto a first communication transmission line, such as first communication transmission line 102 or second communication transmission line 104, and second period waveform 204, such as a PRN waveform, is provided onto a second communication transmission line, such as second communication transmission line 104 (if the first waveform is on first communication transmission line) or first communication transmission line 102 (if the first waveform is on the second communication transmission line) at a transmit end, such as transmit end 106. At a receive end, such as receive end 108, first periodic waveform 202 is modulated by second periodic waveform 204 resulting in composite signal 206 where zero-crossing time of the composite signal received signal, which depends on coupled PRN signal and nominal signal slope is determined.

Figure 3:
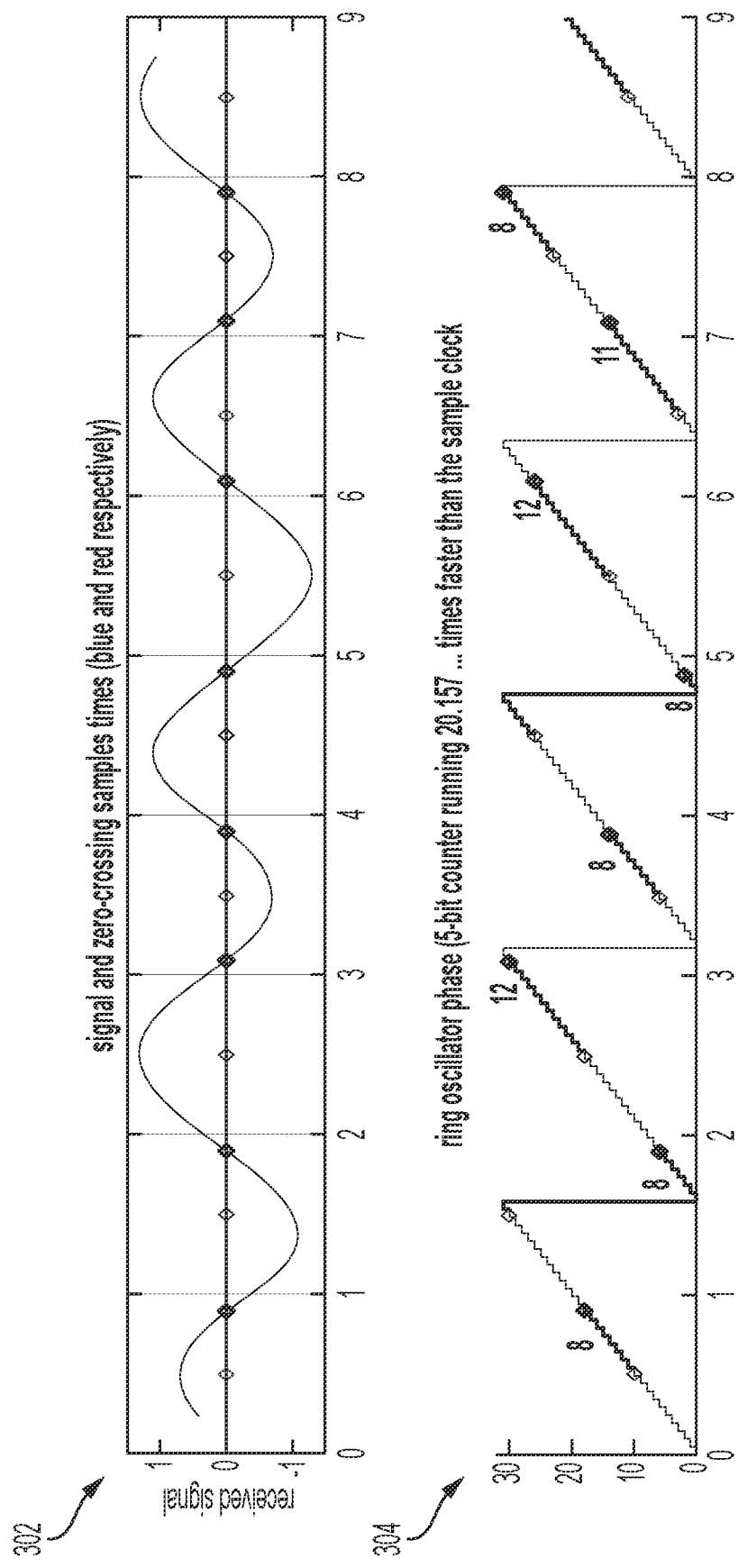
FIG. 3 shows a plot for signal and zero-crossing sample times and a plot of ring oscillator phase according to examples of the present disclosure.

FIG. 3 shows a plot for signal and zero-crossing sample times 302 and a plot of ring oscillator phase 304 according to examples of the present disclosure.

1 Theory

Let S be the symmetric periodic signal with half-period T. i.e., S is a sine wave or a band-limited "square" wave obeying $$S(t+T)=-S(t) \quad (1)$$

where T is the smallest positive value for which S satisfies this equation and so that 2T is the signal period. Also suppose that S is similar to a sine wave or a band-limited "square" wave in that S monotonically increases from its minimum to its maximum in time T (and that it subsequently monotonically decreases from its maximum to its minimum, also in time T). Furthermore, suppose that the signal is aligned such that it's positive going zero-crossing occurs at t=0, i.e., S(0)=0 with S'(0)>0 and finite.

Then, under the influence of a signal P(t) transmitted on an adjacent or other nearby channel, the received signal would be $$S_{rec}(t)=S_0(t)+\epsilon P(t) \quad (2)$$

where $\epsilon$ is the coupling coefficient between the two channels. For a PRN coded signal with the first edge at T1=2, i.e., halfway through a half period of S, and with all subsequent edges offset by integer multiples of T, then the PRN waveform will be constant on each interval $$\left(\left[n-\frac{1}{2}\right]T, \left[n+\frac{1}{2}\right]T\right)$$

and, for sufficiently small E, the received signal near the zero-crossing will be $$S_{rec}(nT+\Delta t) \approx (-1)^n S'(0)\Delta t + \epsilon P_n |P| \quad (3)$$

where $P_n=P(nT)/|P|$ is the sign of the n'th bit of the PRN waveform and $|P|$ is the magnitude of the PRN waveform. The zero-crossing for the received signal will then be offset from the nominal zero-crossing by $$\Delta t_{zero,n} = \frac{-\epsilon P_n |P|}{(-1)^n S'(0)} \quad (4)$$

Or, after separating the sign related terms and the analog terms, $$\Delta t_{zero,n} = \left[(-1)^{n+1} P_n\right] \cdot \left[\frac{\epsilon |P|}{S'(0)}\right] \quad (5)$$

Note that the zero-crossing offset is smaller when the signal edge is faster, i.e., $\Delta t_{zero,n}$ is smaller when S'(0) is larger and, conversely, $\Delta t_{zero,n}$ is larger (and more observable) when the zero-crossing slope S'(0) is smaller.

Practically, and especially for small $\epsilon$, this zero-crossing offset cannot be directly measured. For example, for a −80 dBc coupling, $\epsilon$ will be 1/10,000 which is minuscule compared to the resolution of a timing device operating against a GHz class signal. Clearly, a different approach is needed, and this is where the PRN correlation properties become important. If a noisy measurement of the zero-crossing offset is available, then a correlation of this noisy measurement against the PRN can be used to extract the minuscule coupling coefficient.

To make this more concrete, suppose the uncorrupted zero-crossing follows the nominal signal sampling time by $\alpha T$ for some $0<\alpha<1$. Then the time from the nominal signal sampling time to the zero-crossing time is $$t_{sample,n}=\alpha T + \Delta t_{zero,n} \quad (6)$$

which, for a timing resolution $\tau$ and a measurement error $\epsilon_n$, the reported sample time $m_n$ will satisfy $$t_{sample,n}=m_n \tau + \epsilon_n \quad (7)$$

Correlating the measurements $m_n$ against the sign term in Equation 5 produces the following relation:

$$C = \sum_n \left[(-1)^{n+1} P_n\right] m_n \quad (8)$$

$$= \sum_n \left[(-1)^{n+1} P_n\right] \frac{1}{\tau}(t_{sample,n} - \epsilon_n) \quad (9)$$

$$= \frac{\alpha T}{\tau} \sum_n (-1)^{n+1} P_n + \frac{1}{\tau} \sum_n \left[(-1)^{n+1} P_n\right] \Delta t_{zero,n} - \frac{1}{\tau} \sum_n \left[(-1)^{n+1} P_n\right] \epsilon_n \quad (10)$$

Note that the series multiplying $\alpha T/\tau$ will not be zero in general. However, if the PRN sequence is of length N and is negated when it is repeated so that $P_{n+N}=-P_n$, then the series will be zero. Also, if the PRN and its negation are repeated M times, i.e., a total of 2MN bits are transmitted, then, after substituting Equation 5 for the zero offset, the correlation simplifies to $$C = 2MN\left[\frac{\epsilon |P|}{S'(0)\tau}\right] - \sum_n \left[(-1)^{n+1} P_n\right] \frac{\epsilon_n}{\tau} \quad (11)$$

so that the estimated coupling is $$\hat{\epsilon} = \frac{1}{2MN} \frac{S'(0)\tau}{|P|} C \qquad (12)$$

and the estimation error is $$e_\epsilon = \epsilon - \hat{\epsilon} \qquad (13)$$

$$= \frac{1}{2MN} \frac{S'(0)\tau}{|P|} \sum_n [(-1)^{n+1} P_n] \frac{\epsilon_n}{\tau} \qquad (14)$$

Note that the variance on of the measurement error $e_n$ is $O(\tau^2)$ so that $e_n/\tau$ is an $O(1)$ random variable and the variance of the estimation error is $$\sigma_\epsilon^2 = \left[\frac{1}{2MN} \frac{S'(0)\tau}{|P|}\right]^2 2MN \frac{\sigma_n^2}{\tau^2} \qquad (15)$$

$$= \frac{1}{2MN} \left[\frac{S'(0)\tau}{|P|}\right]^2 \frac{\sigma_n^2}{\tau^2} \qquad (16)$$

The question then becomes: How to perform the zero-crossing time measurements in such a way that $P_n e_n$ is randomized so that the variance of the coupling coefficient estimate is given by Equation 16. Additional objectives include being able to control the integration time (through the parameter M) and having a small temporal resolution $\tau$.

To these ends, the following two time measurement techniques are proposed:

An asynchronous ring oscillator with the time measurement being the difference between the state latched at the zero-crossing and the state latched at the nominal signal sampling time.

A delay measurement circuit triggered at the nominal signal sampling time and stopped at the zero-crossing time.

These techniques are described in more detail in Sections 1.1 and 1.2.

1.1 Ring Oscillator Based Time Measurement

For a ring oscillator, the measurement resolution $\tau$ is the time for the state to propagate from one NOT gate to the next NOT gate in the ring, i.e., a ring oscillator composed of three NOT gates would have a period of $3\tau$.

Here, the timing measurement is the index of the NOT gate that most recently changed state (i.e., the index is a monotonically increasing count until it goes back to zero). The time difference from the nominal signal sampling time and the zero-crossing is calculated modulo the number of stages in the ring oscillator.

The ring oscillator is presumed to be asynchronous to the signal/PRN bit rate so that the measurement error of the nominal signal sampling time is uniformly distributed on $[-\tau/2, \tau/2]$. There are, however, two defects associated with this:

The zero-crossing timer error will be offset from this nominal signal sample timer error by $\alpha T + \Delta t_{zero,n}$ modulo $t$ plus a relatively small amount of ring oscillator jitter. The nominal signal sampling timer error for the next sample will be offset from this sampling timer error by T modulo $t$ plus whatever relatively small jitter is present in the ring oscillator, i.e., the measurement-to-measurement errors will be substantially correlated, however, the PRN induced randomization, along with long integration times, usually suppresses these deterministic errors.

1.2 Time Measurement Circuit

There are a broad class of circuits called Time Delay Measurement (TDM) or Time to Digital Converters (TDCs) that can be used to measure the time between the nominal signal sampling time and the zero-crossing time, i.e., between a "start" and a "stop" strobe. Some of these circuits can achieve 0.1 psec resolutions.

Some of these circuits have analog components and are effectively analog-to-digital converters. As such, they are not appropriate for this application because they will not generate time measurements at the signal bit rate. Thus, only true all-digital circuits are applicable for this application.

The simplest circuits are similar to the ring oscillator-based time measurement discussed in Section 1.1 and are low resolution compared to other techniques such as vernier measurements. Note that, even with 0.1 psec resolution, a TDC still cannot measure a −80 dBc mutual coupling for a 30 Gbps signal, for which the zero-crossing will be offset by $O(0.01)$ psec, i.e., about 1/10 of the TDC measurement resolution. Because of this effect, the TDC must rely on random dither on the measurement, such as jitter on the start and stop signal paths and jitter in the TDC threshold circuit, so that the measurement error is large enough that sub-resolution zero-crossing offsets can be inferred from the PRN correlation.

2 Simulation

This section of the paper describes the simulations used to validate the measurement method. Section 2.1 describes the PRN generation, Section 2.2 describes how the simulator execution time was reduced, and Section 2.3 describes the jitter model on the ring oscillator used for the zero-crossing measurements.

2.1 Pseudo Random Number Generation

Binary Pseudo Random Number (PRN) codes are well suited to this application for a few reasons:

They can operate at the bit rates for modern high-speed serial interfaces, i.e., at speeds of 58 Gbps, since, for hard-wired codes, they can be computing using a few simple gates and a shift register.

They have near-ideal autocorrelation properties, namely, for a length N sequence $$R(m) = \sum_{n=0}^{N-1} P_n P_{n+m} \qquad (17)$$

$$= \begin{cases} N & \text{if } m = 0 \\ 1 & \text{otherwise} \end{cases} \qquad (18)$$

so that the timing for which the mutual coupling is being measured can be precisely controlled by the temporal offset at which the PRN generator starts.

Reference [1], which was first published almost 60 years ago, describes PRN generation as polynomial division using modulo 2 arithmetic, i.e., all of the polynomial coefficients are either 0 or 1, and addition and subtraction are performed modulo 2. The PRN generator is an order N' polynomial with the following two properties:

It is irreducible. i.e., it cannot be divided by any polynomial of degree 1 to N'−1. It is primitive. i.e., the lowest order polynomial of the form $x^m + 1$ divided by the PRN generator is $m = 2^{N'} - 1$. Practically, this means that the bit sequence generated by the N' bit PRN generator repeats after $2^{N'} - 1$ bits but not before then. See page 161 of Reference [1] for more details on this property.

2.2 The Simulator

The simulation was originally written in MATLAB, but was taking a long time to run because of the large value of 2MN and because of the number of test cases being run. The core of the simulation, the evaluation of a particular test case consisting of a PRN generator, correlation length, relative ring oscillator speed, oscillator jitter power, mutual coupling, signal slope S'(0), and initial random number, was translated from MATLAB to C++. This resulted in a speedup by a factor of three.

The C++ random number generator used for the phase jitter was using about ⅔ of the simulation time, so it was translated to a simpler in-line formula which reduced the run time by an additional factor of two.

Finally, running seven iterations in parallel on an i7 laptop resulted in additional speedup by a factor of four. A speedup of seven likely was not attained because of thermal limits in the laptop cooling system.

The composite speedup by a factor of 22 from an original runtime of over 10 minutes makes extensive simulations more feasible.

2.3 Jitter Effect on Measurement Performance

Unlike most simulations, pristine sampling produces lousy estimation performance. In particular, without phase noise, particular ring oscillator rates relative to the signal/PRN bit rates results in very poor mutual coupling estimation.

Figure 4:
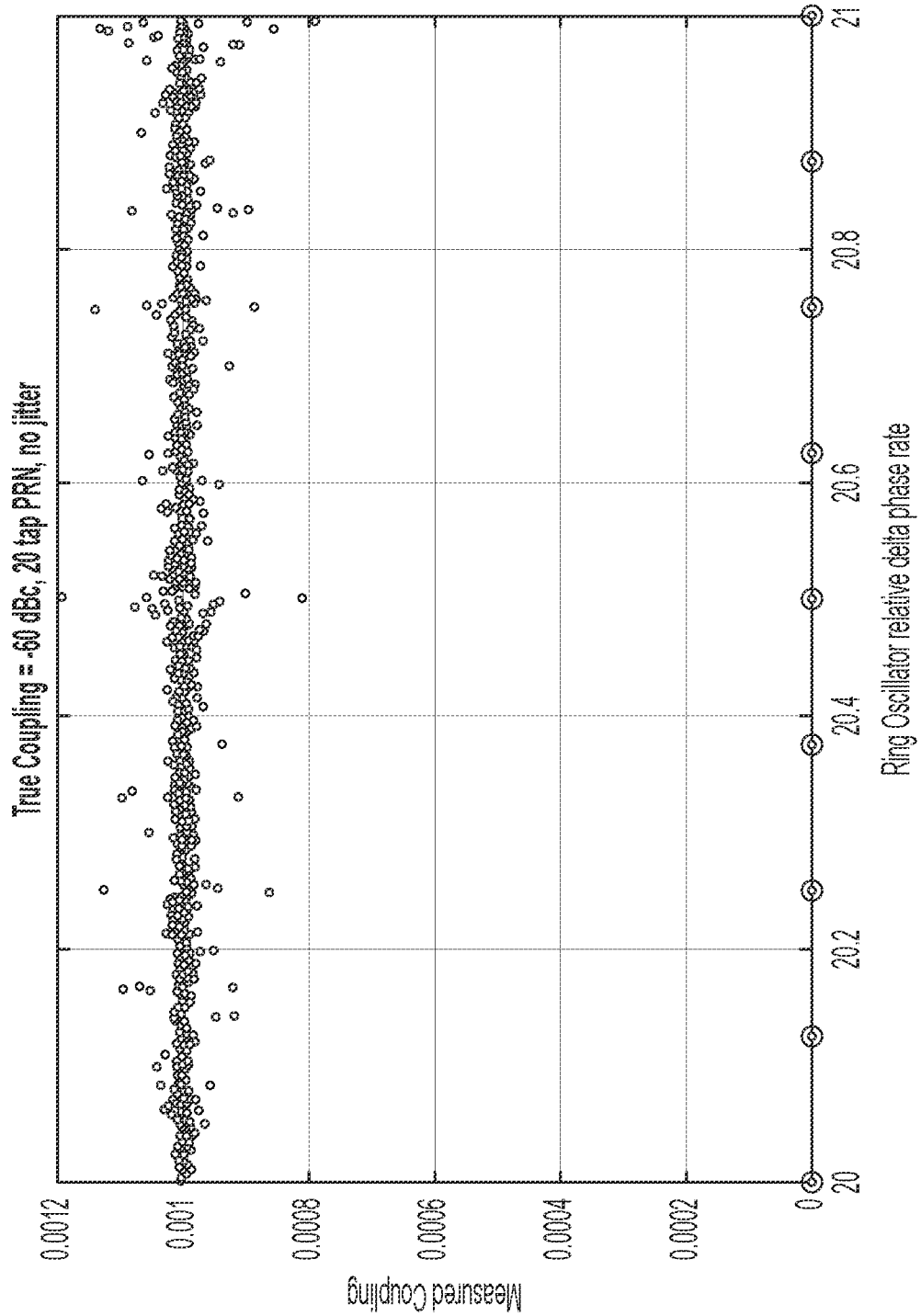
FIG. 4 shows a plot of lousy mutual coupling measurements can occur when the ring oscillator is jitter free according to examples of present disclosure.

FIG. 4 shows a plot of lousy mutual coupling measurements can occur when the ring oscillator is jitter free according to examples of present disclosure. Here, the relative ring oscillator rate is the rate at which the ring oscillator phase steps occur relative to the signal/PRN bit rate. i.e., a relative rate of 20 means that the fractional phase portion of the ring oscillator increments 20 times during each signal/PRN bit. The plot shows 1001 relative rates, from 20 to 21 in steps of 0.001. The relative rates at 20, 20.125, 20.25, ..., 21 produce measured couplings of zero instead of the simulated value of 0.001. The remaining relative rates produce coupling measurements that are close to the simulated value of −60 dBc.

Figure 5:
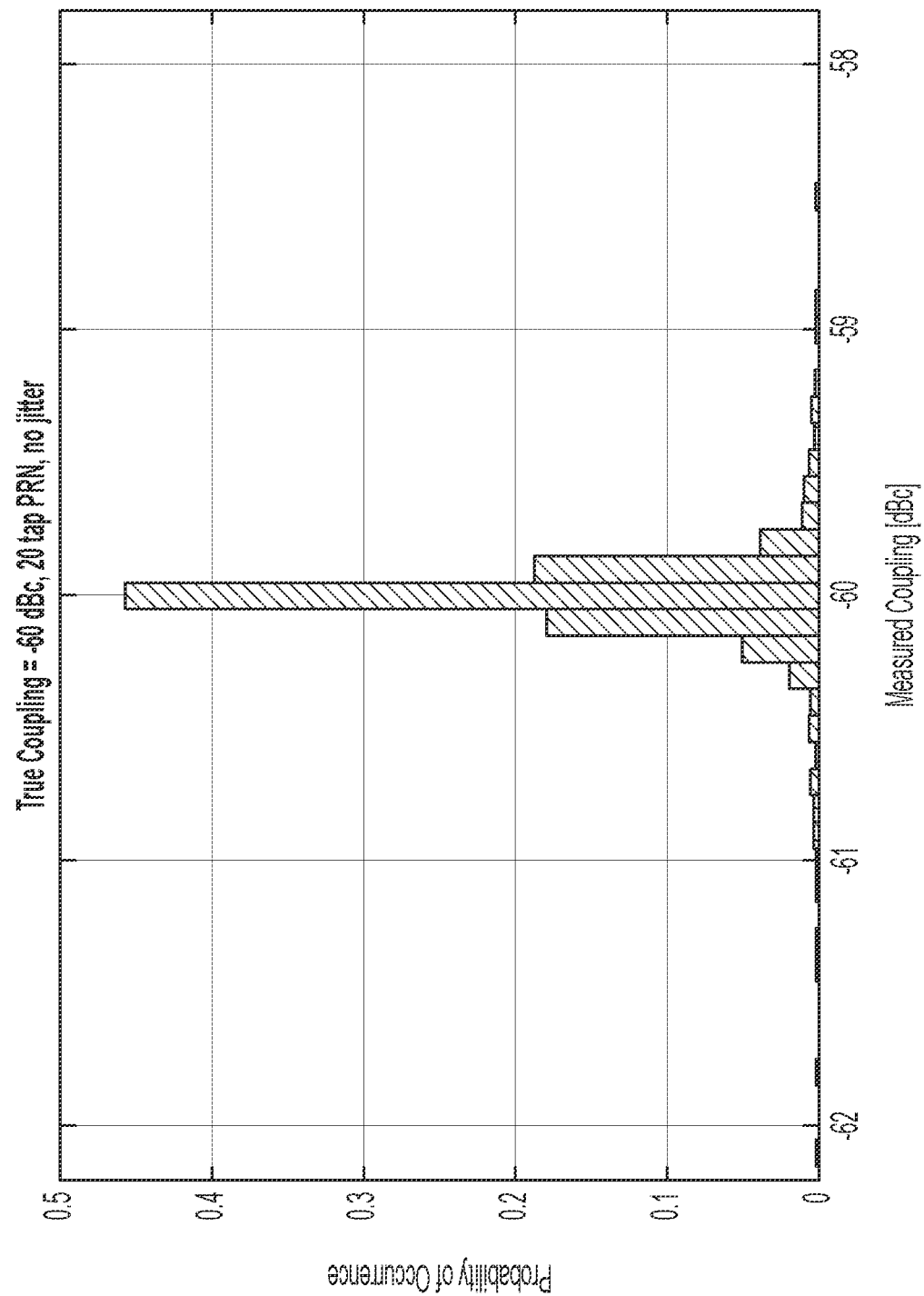
FIG. 5 shows a histogram of the non-zero values of the measured coupling with no jitter according to examples of the present disclosure.

FIG. 5 shows a histogram of the non-zero values of the measured coupling with no jitter according to examples of the present disclosure. This excludes the nine cases where the relative ring oscillator rate was a multiple of 1/8 and the reported measurement was unrealistically small. The mean coupling is −60.0084 dBc with a standard deviation of 0.21 dBc.

Figure 6:
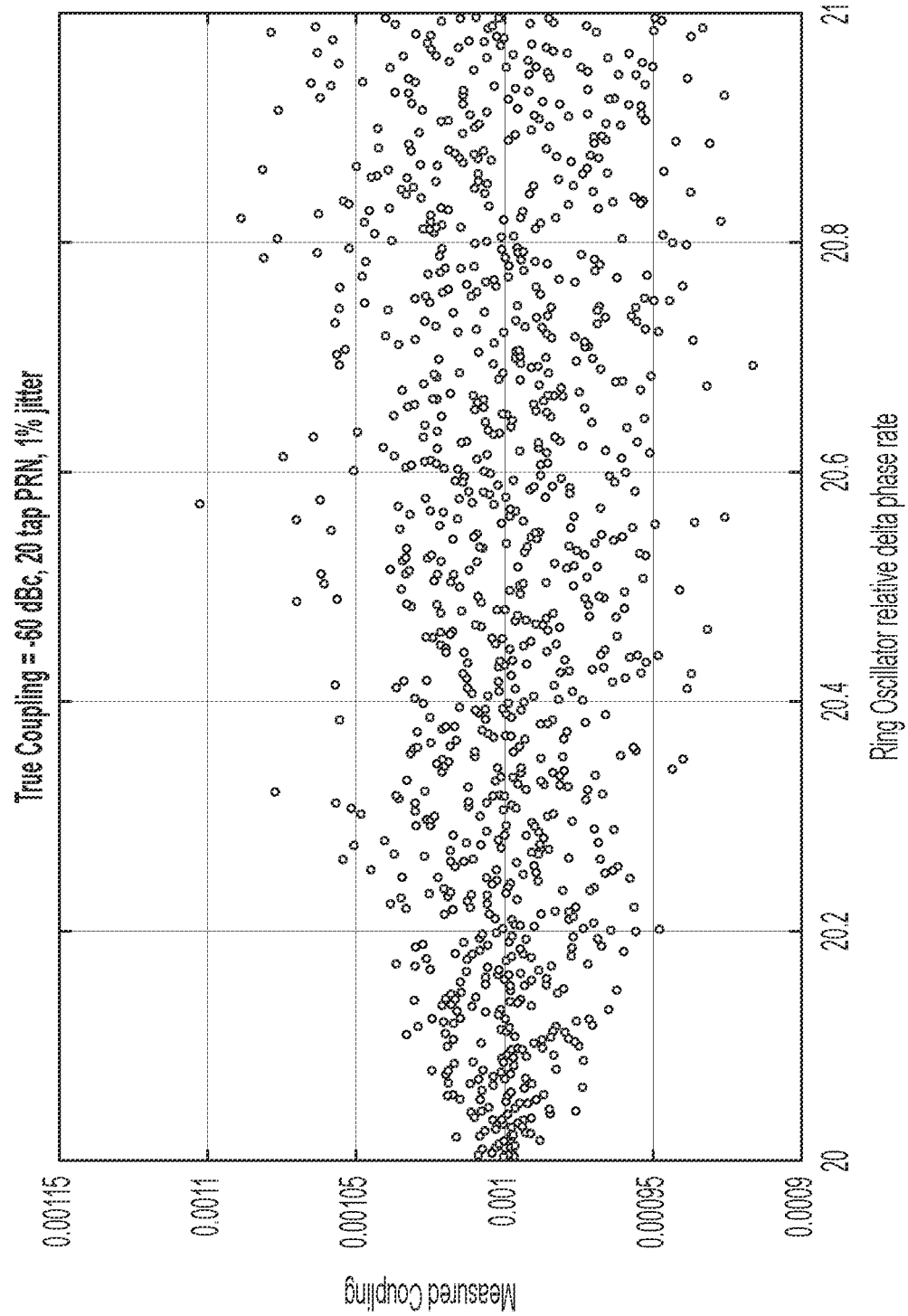
FIG. 6 shows the mutual coupling measurements improve when jitter is included in the ring oscillator model according to examples of the present disclosure.
Figure 7:
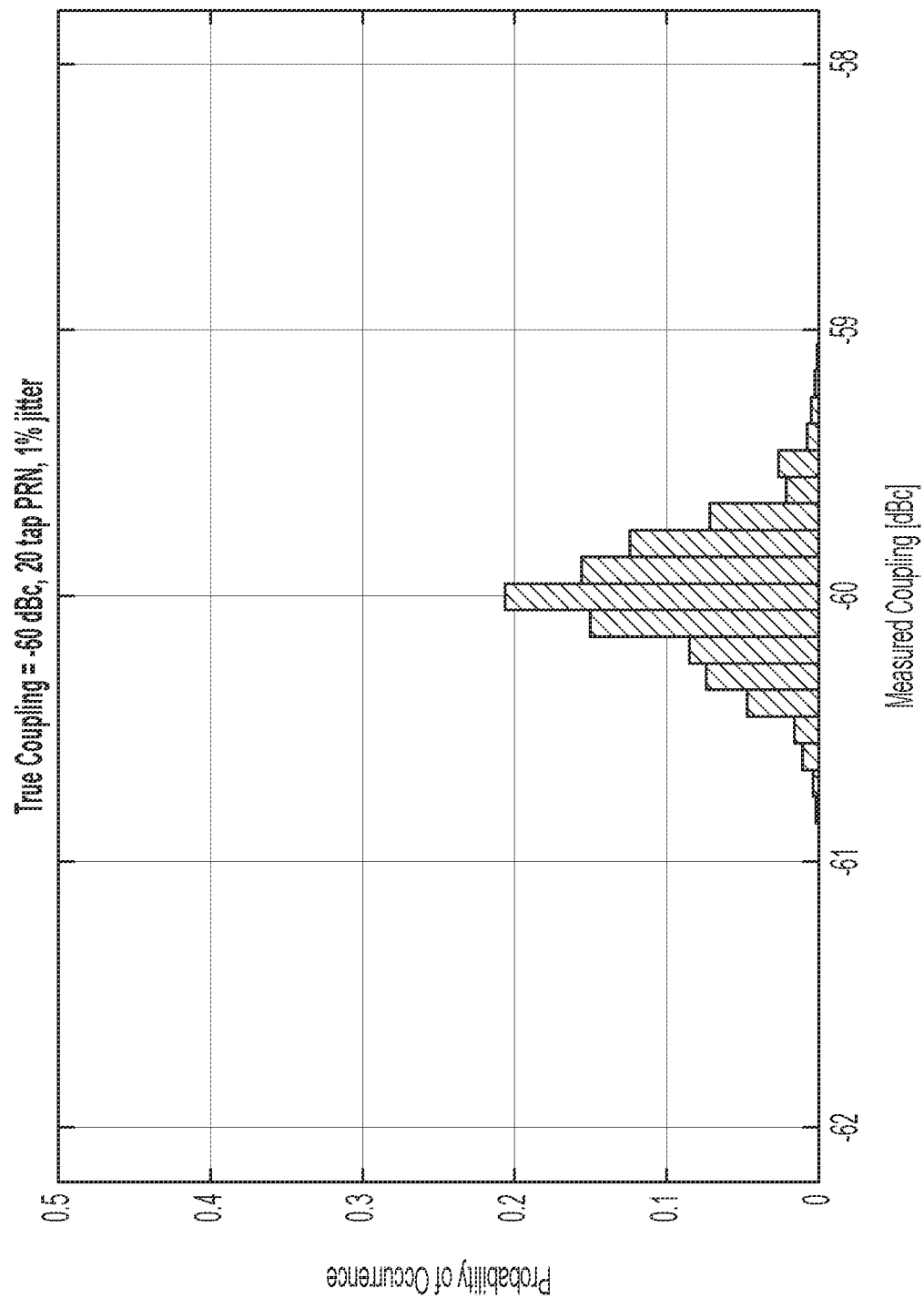
FIG. 7 shows a histogram of the measured coupling with 1% RMS jitter according to examples of the present disclosure.

FIG. 6 shows the mutual coupling measurements improve when jitter is included in the ring oscillator model according to examples of the present disclosure. Adding jitter to the ring oscillator phase rate mitigates this error. To demonstrate this, 1% RMS jitter is added to the ring oscillator phase count per signal/PRN bit. The resulting coupling measurements as a function of ring oscillator relative phase rate are plotted in FIG. 6 for the same relative rates as in FIG. 4. The measured couplings are all now "good" in the sense that they are clustered around the true value, see FIG. 7 which is plotted with the same horizontal and vertical scales as FIG. 5. While the standard deviation of the data plotted in FIG. 7 is almost the same as that in FIG. 5, the plots would suggest otherwise, but the data in FIG. 5 has several outliers that substantially increase the standard deviation. Also, note that the clustering in FIG. 6 changes from being tightly clustered around the true mutual coupling when the relative rate is near 20, but is spread out as the relative rate progresses toward 21. This occurs because the zero-crossing in the simulations occur near the half-way-point of the cycle, so that even relative rates, 20 in this case, make the deviation in the zero-crossing more observable (this was confirmed by examining similar plots with the relative rate varying from 3 to 20 and seeing similar clustering at the even relative rates and nowhere else, see FIG. 8).

These simulations were performed with 128 repetitions of the PRN sequence from a 20th order polynomial, i.e., a total of 134,217,600 bits/zero-crossings. For a 10 Gbps channel, each measurement would take about 13.4 msec, which is a reasonable collection time. The model was also set so that the zero-crossing edges were 5 times steeper than a sine wave, i.e., S'(0)=5π as opposed to a sine wave for which S'(0)=π.

Finally, the jitter is modeled using a simple model, namely, uniformly distributed values on $[-\sqrt{3}\sigma, \sqrt{3}\sigma]$ where σ=0.01 for 1% noise. This random value is added to the ring oscillator phase once per signal/PRN bit. For a relative ring oscillator rate of 20, this reduces the effective noise per ring oscillator stage by $1/\sqrt{20}$, so that the ring oscillator noise is effectively 0.22% per phase step. This appears to be a reasonable value based on oscillator jitter values found using Google.

FIG. 7 shows a histogram of the measured coupling with 1% RMS jitter according to examples of the present disclosure. The mean coupling is −59.9997 dBc with a standard deviation of 0.24 dBc.

3 Performance

Now that the method has been demonstrated to work, at least for −60 dBc coupling and 1% jitter, the question is: How well does it work and what is the smallest coupling that it can measure? This section documents numerical experiments exploring these questions.

Figure 8:
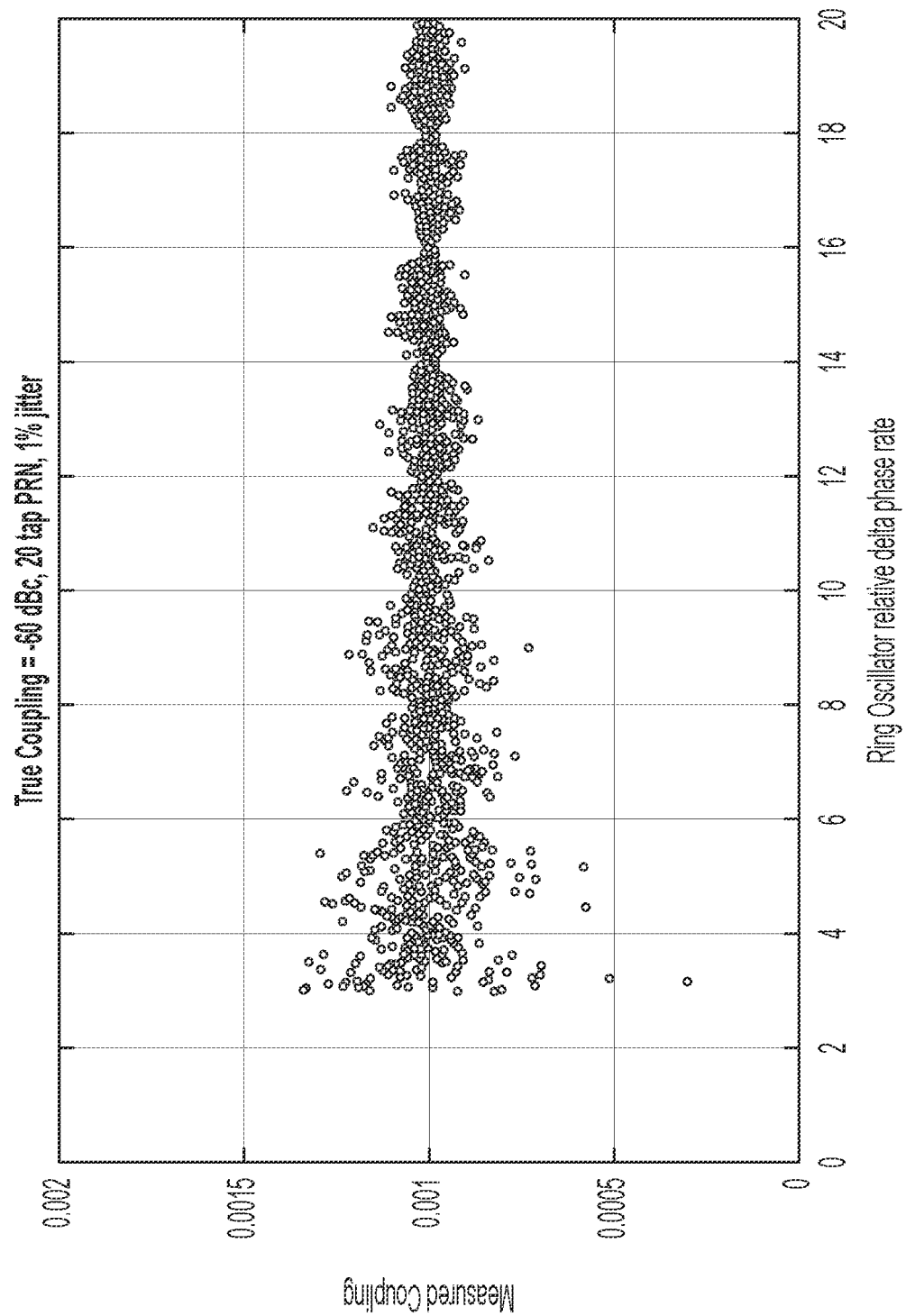
FIG. 8 shows mutual coupling measurements for relative ring oscillator rates from 3 to 20 according to examples of the present disclosure.

Continuing with the −60 dBc coupling, 20-bit PRN generator, and S'(0)=5π, the relative ring oscillator rate is varied from 3 to 20 in order to assess what a good lower bound on the rate would be. FIG. 8 shows mutual coupling measurements for relative ring oscillator rates from 3 to 20 according to examples of the present disclosure. The resulting data, simulated in increments of 1/100, is plotted in FIG. 8. This suggests a relative ring oscillator rate of 7, corresponding to 5 psec NOT gate delay for a 58 Gbps channel, which is well within the capability of lithography nodes required for the 58 Gbps channel. While choosing an even ratio would provide better performance, achieving an even ratio in silicon could be a challenge, so an odd ratio, such as 7, should provide a more realistic assessment of the achievable system performance.

Figure 9:
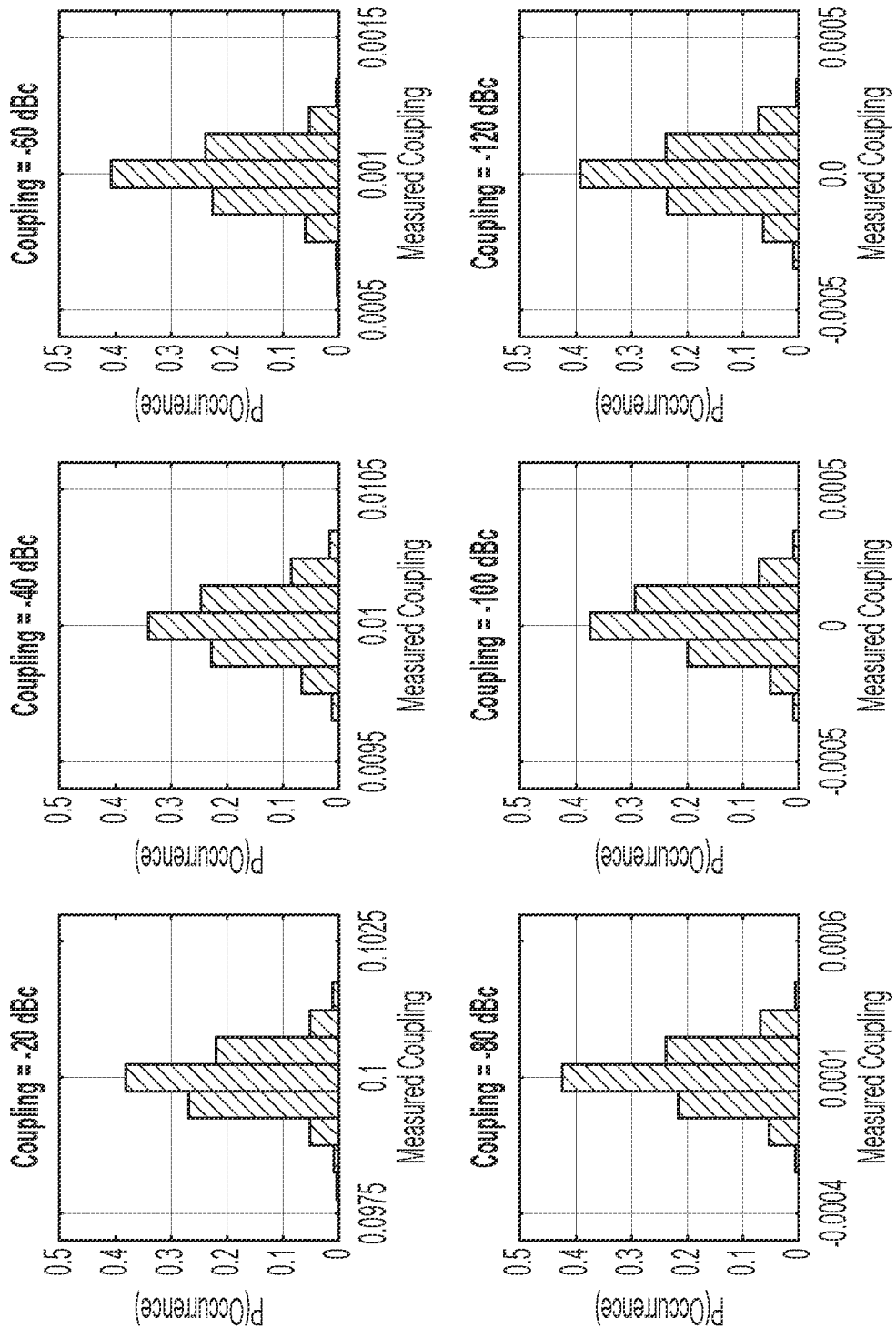
FIG. 9 shows the mutual coupling measurements for mutual couplings from −20 dBc to −120 dBc according to examples of the present disclosure.

FIG. 9 shows the mutual coupling measurements for mutual couplings from −20 dBc to −120 dBc according to examples of the present disclosure. Each case used a 20-bit PRN generator, 128 cycles, and 1% jitter. Next, the mutual coupling is varied from −20 dBc to −120 dBc in 20 dBc steps using a relative ring oscillator rate of 7. The resulting data is plotted in FIG. 9 while the mean and standard deviation are listed in Table 1. Note that the horizontal axes are not the same in all of the plots of FIG. 9. In particular, the standard deviation of the measured coupling becomes large compared to the true coupling so that the histograms become dominated by the standard deviation. The means and standard deviations listed in the table illustrate this with the relative estimation error varying from 0.03% for the −20 dBc case to about 25% for the −100 dBc case. The −120 dBc case has the wrong sign and magnitude, which illustrates the estimation failure for this most extreme estimation attempt, but which may be attributable to the single precision arithmetic in the accelerated C++ code.

TABLE 1

Coupling measurement performance

| Mutual Coupling | Mean Estimate | Standard Deviation |
|---|---|---|
| −20 dBc | 0.9997e−1 | 5.0e−4 |
| −40 dBc | 1.0005e−2 | 1.1e−4 |
| −60 dBc | 0.9992e−3 | 9.6e−5 |
| −80 dBc | 1.05e−4 | 9.6e−5 |
| −100 dBc | 1.26e−5 | 1.0e−4 |
| −120 dBc | −1.2e−6 | 1.0e−4 |

The next set of runs illustrate an attempt to improve the estimation performance for the −100 dBc coupling case by increasing the integration time. The same 20-bit PRN generator is used in each case, but the integration time is doubled in each successive test, starting at 128 integration cycles and ending at 1024 integration cycles. For a 58 Gbps channel, these correspond to integration times of 2.7 msec to 22 msec. While these individual integration times are short, the need to do multiple measurement increases the effective integration time proportionately. The resulting measurement histograms are plotted in FIG. 10 and the mean and standard deviations are listed in Table 2. In each plot in FIG. 10, the true coupling is the first histogram bin to the right of the zero and some asymmetry is present in the plots, except for the shortest integration time of 128 cycles, as is evidenced by the data listed in Table 2. The standard deviations in the table follow the usual $1/\sqrt{N}$ behavior.

TABLE 2

Measurement performance against a −100 dBc coupling

| Integration Cycles | Mean Estimate | Standard Deviation |
|---|---|---|
| 128 | 0.55e−5 | 9.5e−5 |
| 256 | 1.1e−5 | 7.0e−5 |
| 512 | 0.81e−5 | 4.8e−5 |
| 1024 | 0.998e−5 | 3.5e−5 |

Figure 10:
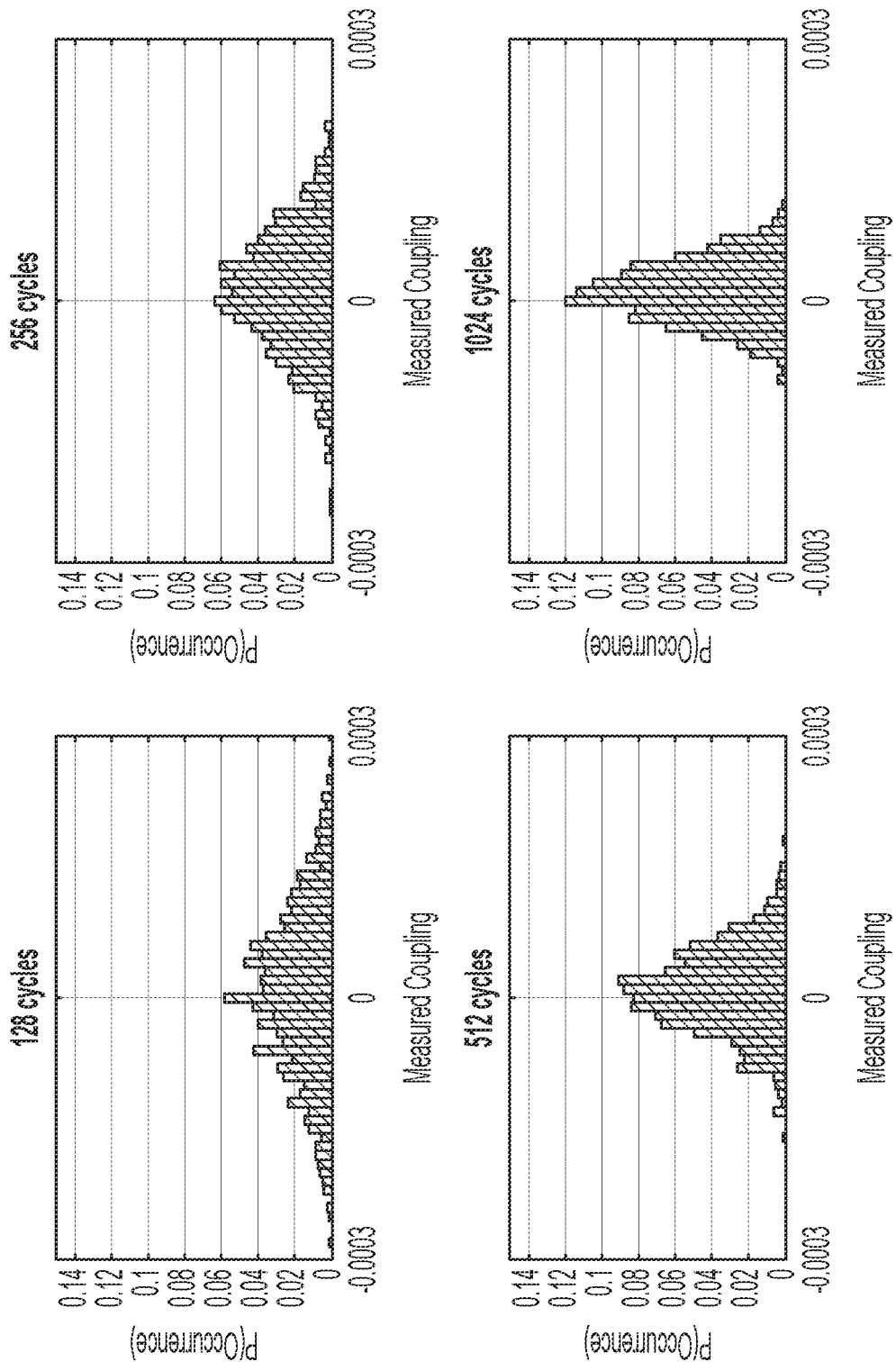
FIG. 10 shows measurements for a mutual coupling of −100 dBc, a 20 bit PRN generator 1% jitter, and varying numbers of integration cycles according to examples of the present disclosure.

FIG. 10 shows measurements for a mutual coupling of −100 dBc, a 20-bit PRN generator 1% jitter, and varying numbers of integration cycles according to examples of the present disclosure.

Figure 11:
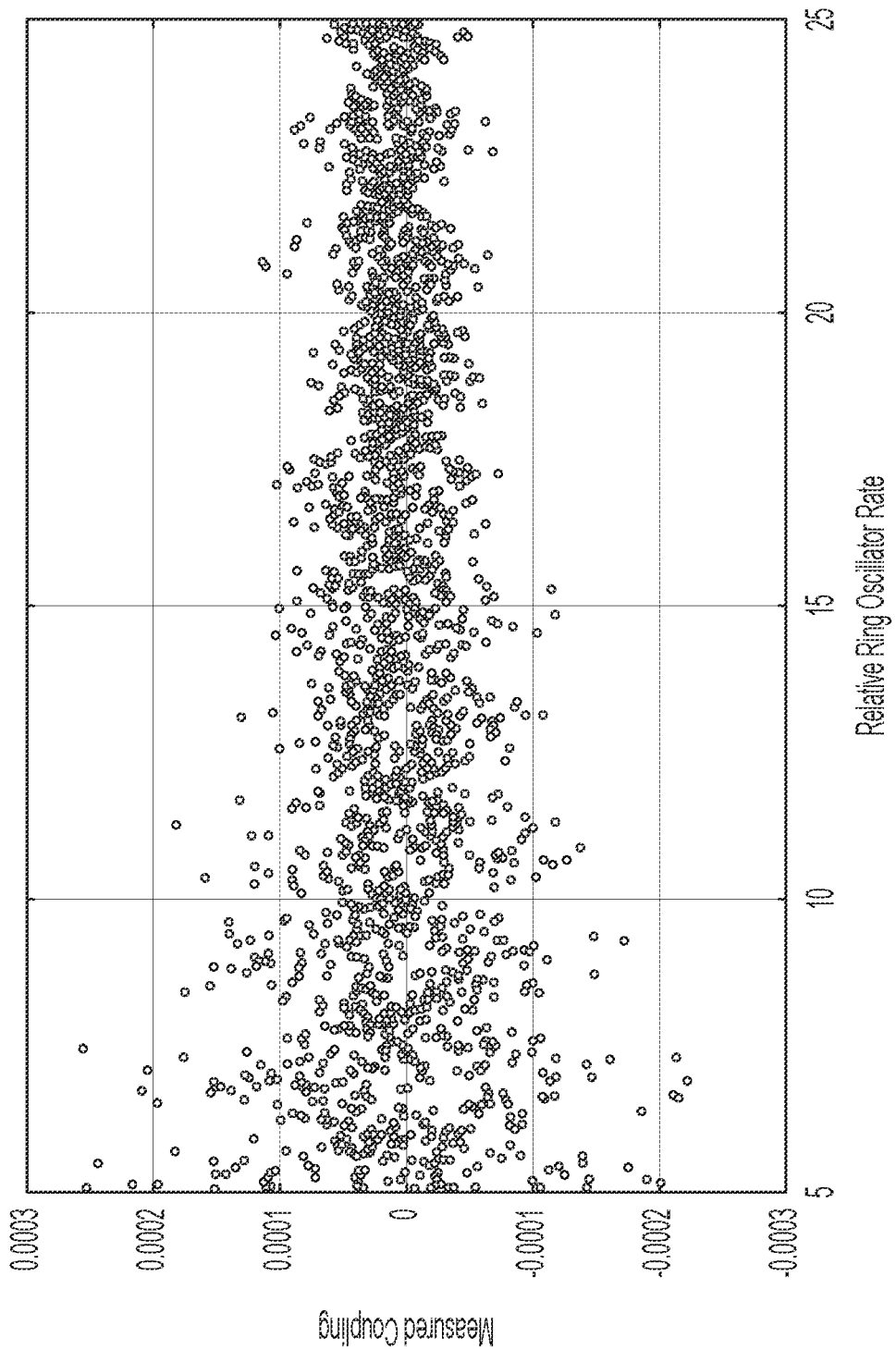
FIG. 11 shows the effect of the relative ring oscillator rate on the mutual coupling measurement according to examples of the present disclosure.

The effect of the relative ring oscillator rate for the −100 dBc coupling with 128 integration cycles and 1% jitter is plotted in FIG. 11. This illustrates the benefit of making the time resolution finer. Repeating the integration time experiment with a relative ring oscillator rate of 21 produces the histogram plotted in FIG. 12, for which the mean coupling estimate is 0.93e-6 with a standard deviation of 3.2e-5. Compared to the first row of Table 2, this is a 7% error instead of a 45% error and the standard deviation has reduced by a factor of 3 (because the "ADC" effectively tripled in resolution when the relative ring oscillator rate was tripled from 7 to 21).

FIG. 11 shows the effect of the relative ring oscillator rate on the mutual coupling measurement according to examples of the present disclosure. This is for a mutual coupling of −100 dBc, a 20-bit PRN generator, and a 1% jitter.

Figure 12:
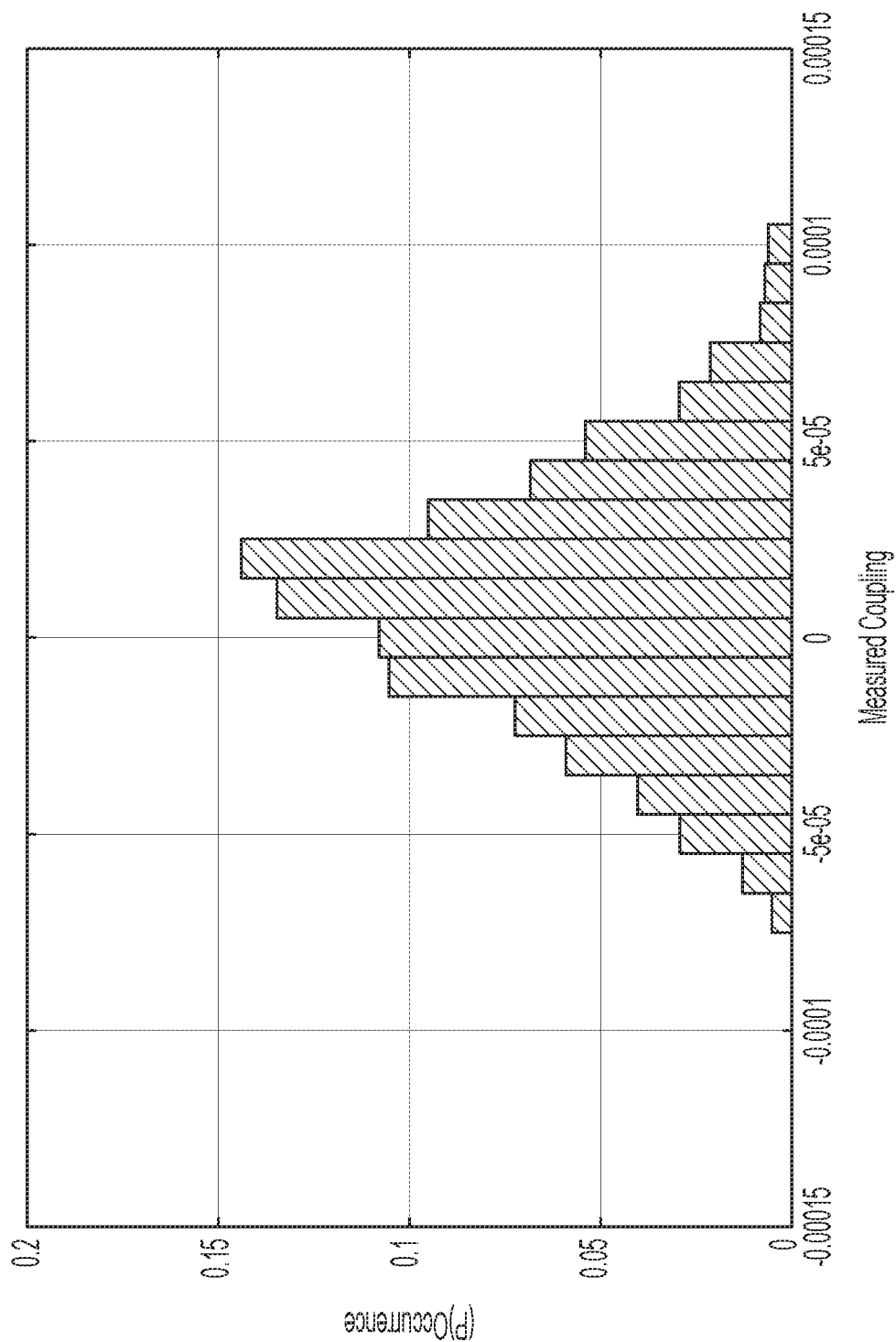
FIG. 12 shows a histogram of mutual coupling measurements for a relative ring oscillator rate of 21 according to examples of the present disclosure.

FIG. 12 shows a histogram of mutual coupling measurements for a relative ring oscillator rate of 21 according to examples of the present disclosure. This is for a mutual coupling of −100 dBc, a 20-bit PRN generator, and a 1% jitter.

The final numerical experiment is to investigate what effect, if any, the PRN generator length has on the estimation performance. This was run with a mutual coupling of −80 dBc, a nominal integration length of 128 of the 20-bit PRN generator cycles, about 227 samples, and twelve PRN lengths from 15 through 26 bits. The results are plotted in FIG. 13 and listed in Table 3. The performance as a function of PRN length is almost identical for all twelve test cases.

Figure 13:
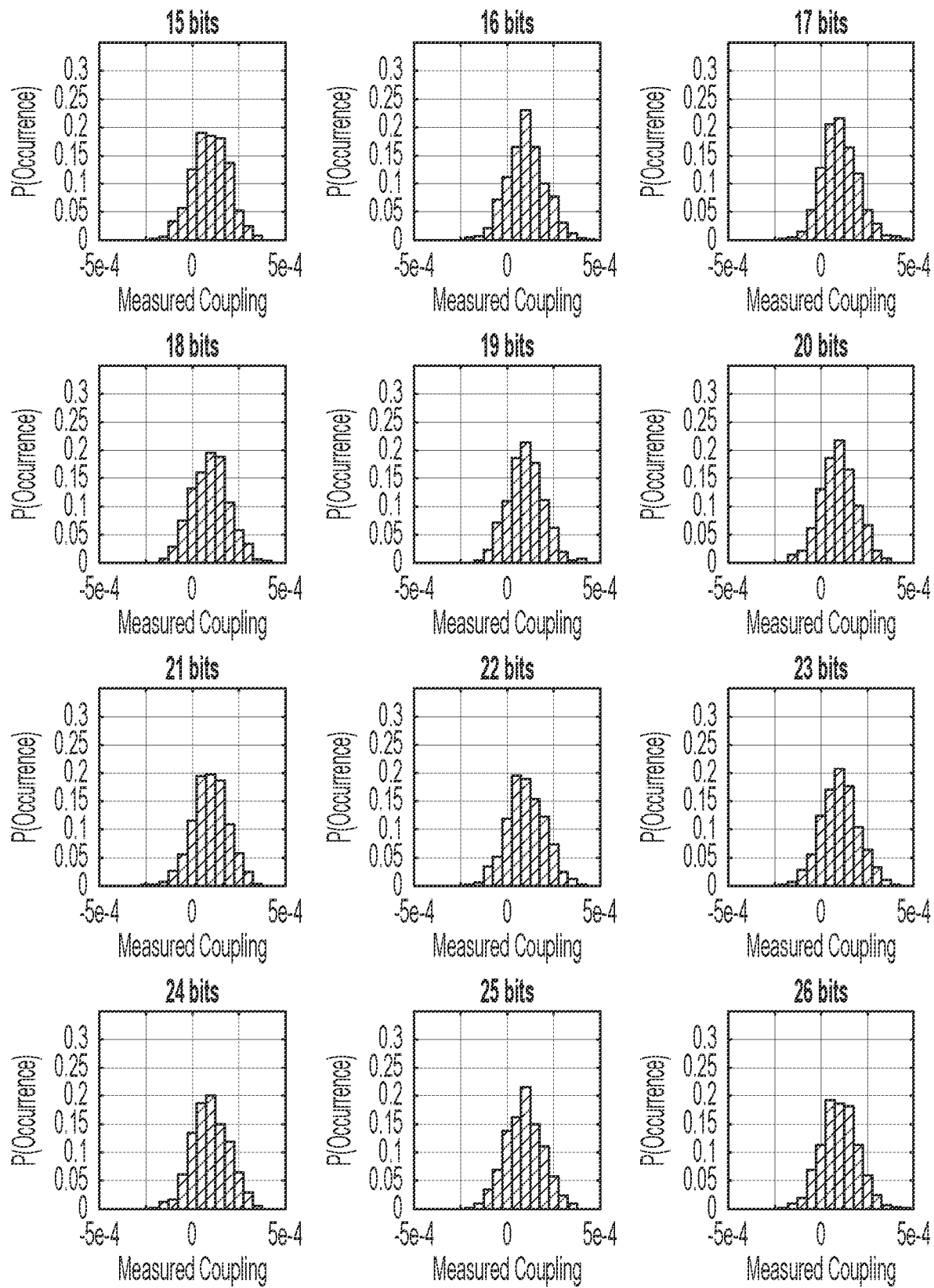
FIG. 13 shows the effect of PRN length on mutual coupling measurements for a constant integration length according to examples of the present disclosure.

FIG. 13 shows the effect of PRN length on mutual coupling measurements for a constant integration length according to examples of the present disclosure. The mutual coupling is −80 dBc with a 1% jitter.

TABLE 3

Varying PRN length with constant integration time

| PRN Length | Mean Estimate | Standard Deviation |
|---|---|---|
| 15 | 0.940e−4 | 0.991e−4 |
| 16 | 1.045e−4 | 0.983e−4 |
| 17 | 1.050e−4 | 0.957e−4 |
| 18 | 1.015e−4 | 0.976e−4 |
| 19 | 0.993e−4 | 0.969e−4 |
| 20 | 1.0035e−4 | 0.949e−4 |
| 21 | 0.984e−4 | 1.001e−4 |
| 22 | 0.975e−4 | 0.980e−4 |
| 23 | 1.013e−4 | 1.000e−4 |
| 24 | 1.010e−4 | 0.957e−4 |
| 25 | 0.995e−4 | 1.024e−4 |
| 26 | 0.948e−4 | 0.998e−4 |

Figure 14:
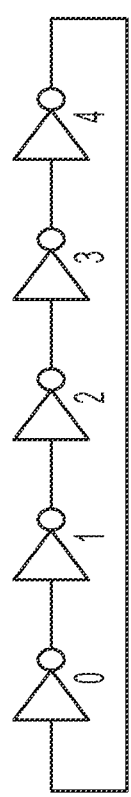
FIG. 14 shows a ring oscillator configured as a string with a single inverter followed by an odd number of buffers (non-inverting gates) according to examples of the present disclosure.
Figure 15:
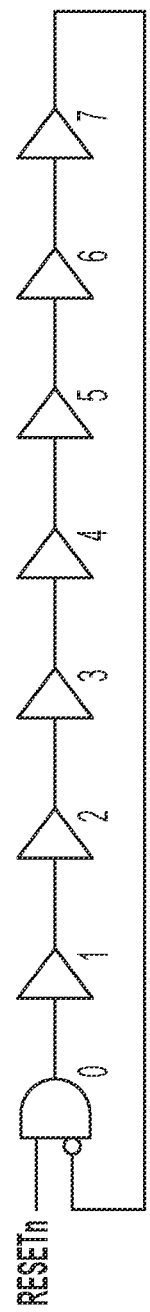
FIG. 15 shows a ring oscillator configured as a string of odd number inventers according to examples of the present disclosure.
Figure 18:
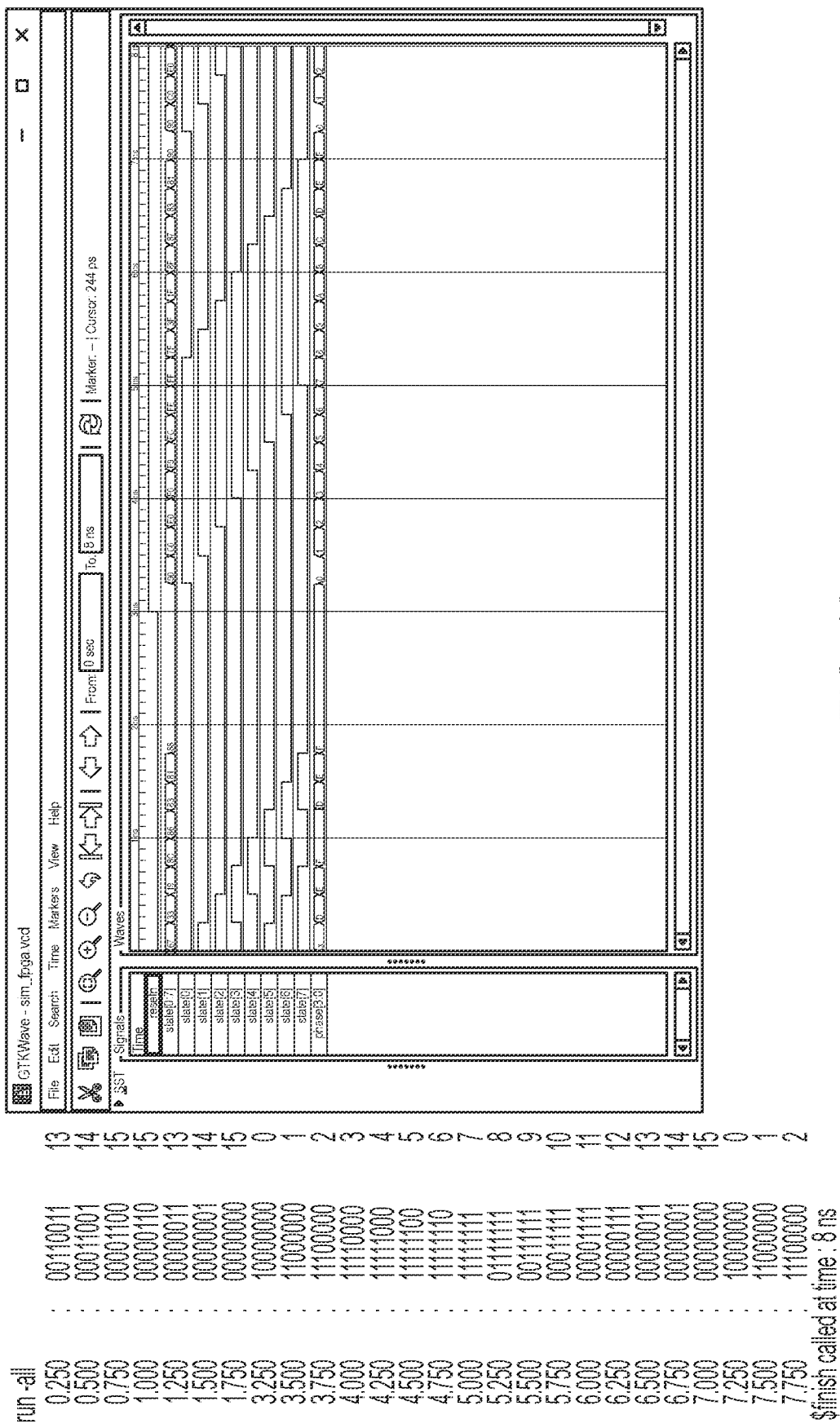
FIG. 18 shows simulation results according to examples of the present disclosure.

In some examples, a ring oscillator can be configured as a string of odd number NOT gates and can be arranged in one or more FPGAs that measures time events. FIG. 14 shows a ring oscillator configured as a string with a single inverter followed by an odd number of buffers (non-inverting gates) according to examples of the present disclosure. FIG. 16 shows sample code for a ring oscillator according to examples of the present disclosure. The ring oscillator arranged in one or more FPGAs can also be implemented as an odd number of inventers arranged in a string, i.e., one inverter. The use of a power of 2 will have the equivalent of a count for a clock "phase." FIG. 15 shows a ring oscillator configured as a string of odd number inventers according to examples of the present disclosure. The arrangement shown in FIG. 15 comprises 16 states so that the phase can be measured in roughly 22.5° increments. For example, this arrangement can be used to measure time-of-arrival (TOA) of clock edges relative to a reference clock. FIG. 17 shows code for a simulated FPGA design according to examples of the present disclosure. FIG. 18 shows simulation results according to examples of the present disclosure. FIG. 19 shows code for a simulated Xilinx FPGA design according to examples of the present disclosure.

Figure 20:
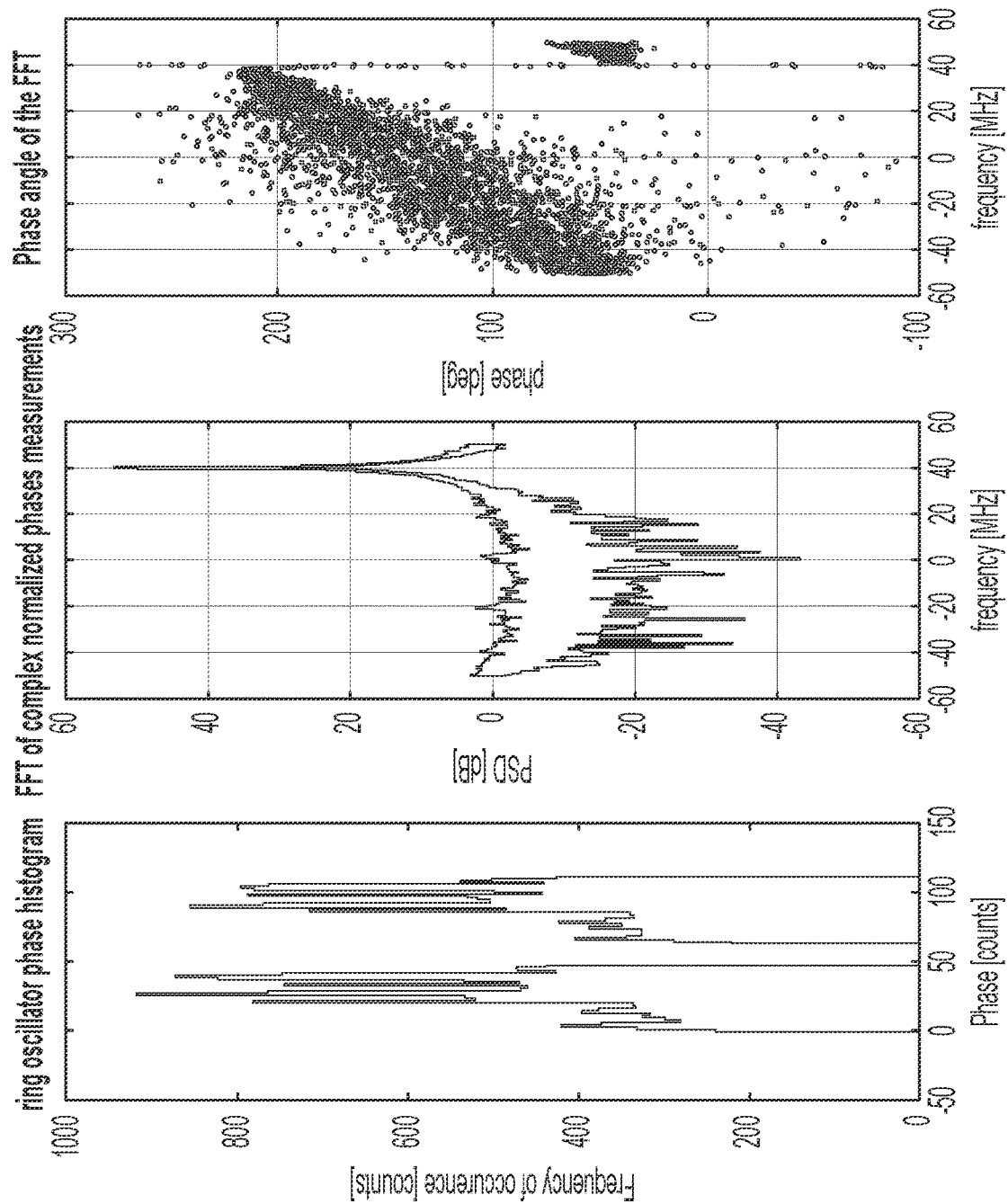
FIG. 20 shows plot for 48-LUT Ring Oscillator sampled by a 100 MHz oscillator according to examples of the present disclosure.
Figure 21:
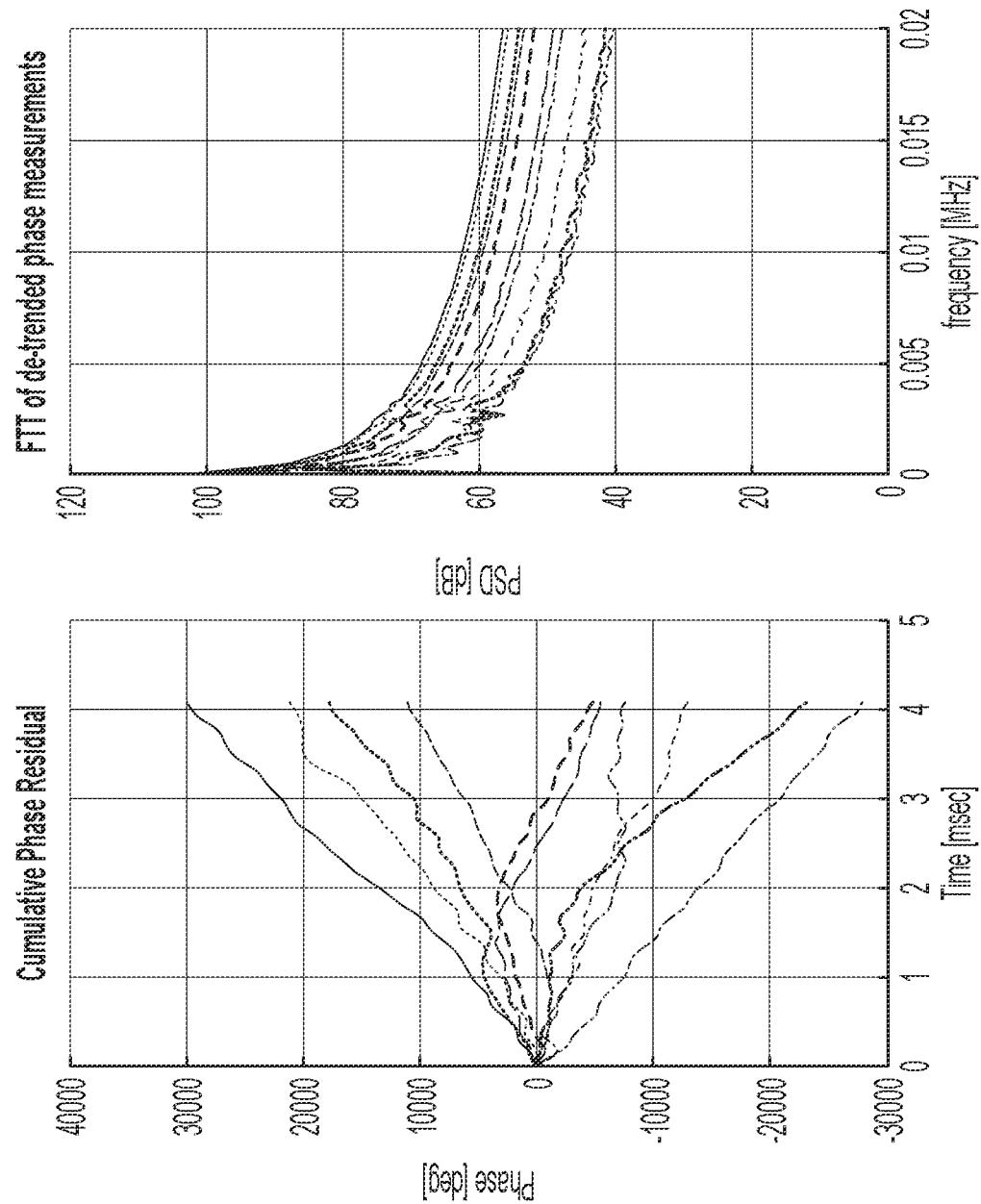
FIG. 21 shows a plot of reported phase includes a wrap-around count (32 bits total) according to examples of the present disclosure.

FIG. 20, and FIG. 21 show plots of LUT-based Ring Oscillator behavior according to examples of the present disclosure. FIG. 20 shows plot for 48-LUT Ring Oscillator sampled by a 100 MHz oscillator according to examples of the present disclosure. As shown in FIG. 20, the "0" propagation is similar to the "1" propagation, the upward propagation speed vs. the downward propagation is radically different, and the propagation time is proportional to the histogram height. FIG. 21 shows a plot of reported phase includes a wrap-around count (32 bits total) according to examples of the present disclosure. As shown in FIG. 21, infrequent samples are included, the common phase rate (i.e., frequency) is removed, and substantial wander in the clock frequency is shown.

Figure 22:
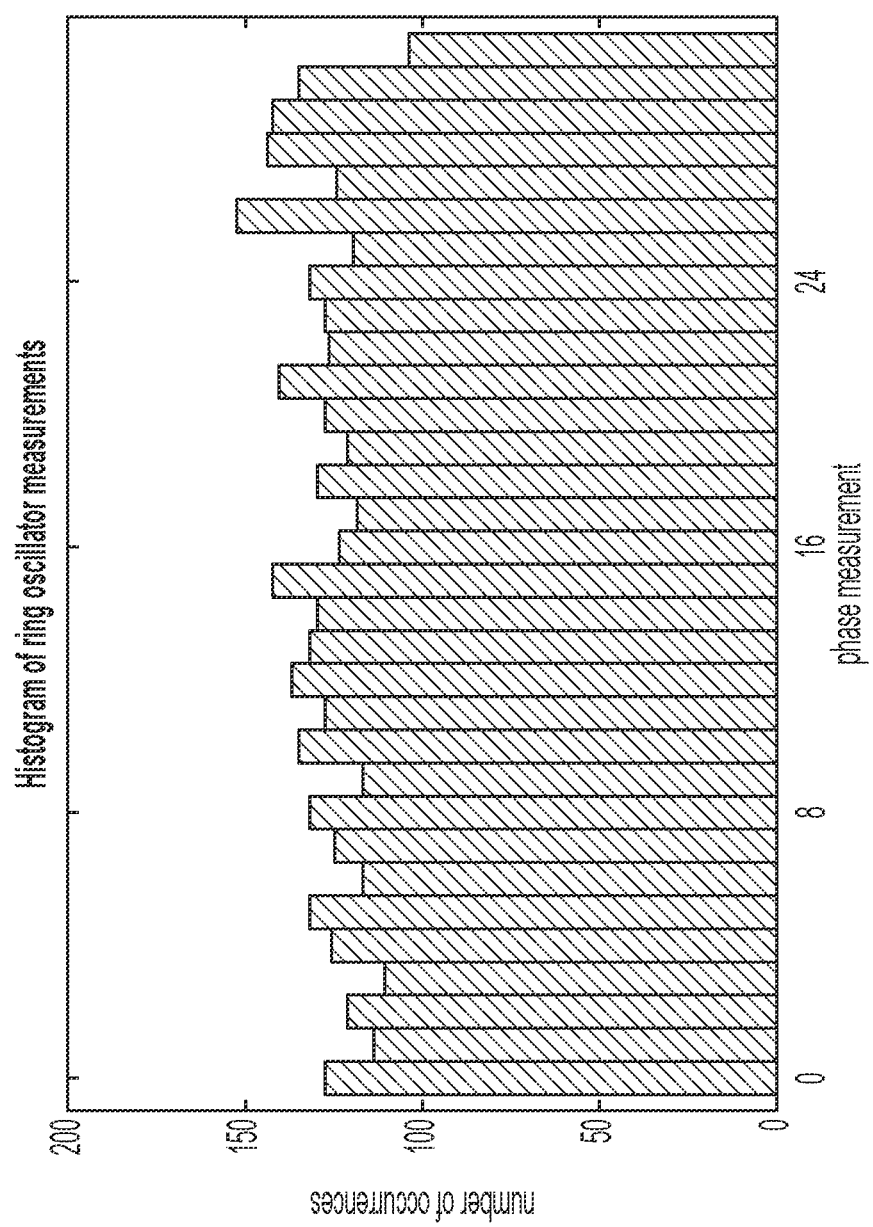
FIG. 22 shows a histogram of ring oscillator measurements according to examples of the present disclosure.

FIG. 22 shows a histogram of ring oscillator measurements according to examples of the present disclosure. As shown in FIG. 22, the response is fairly flat unlike FIG. 20. Counting statistic noise is about 11 counts per bin. This is about as large as most of the "features". The "flat" response or nearly equal delay times is shown for each phase bin. However, this leaves the question of which are features and which are counting statistics.

Figure 23:
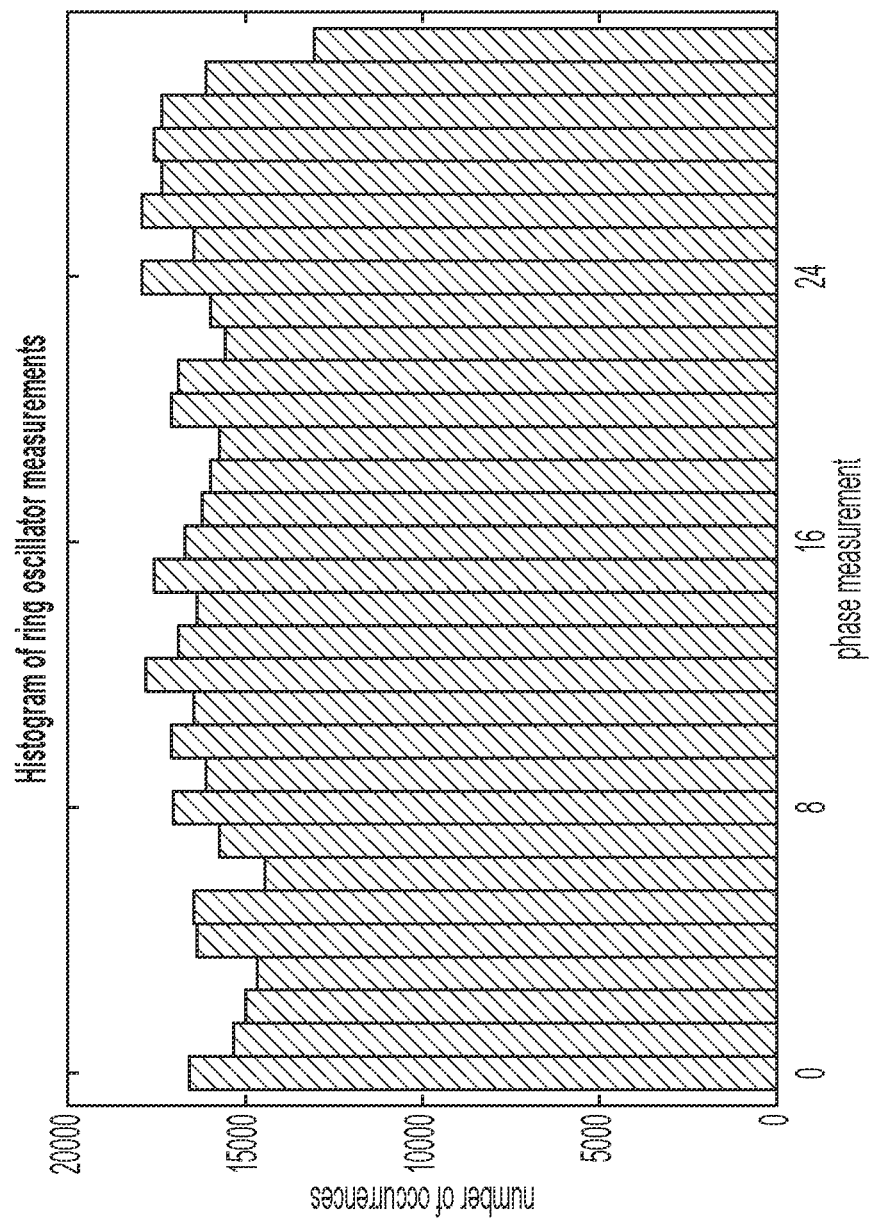
FIG. 23 shows a histogram of ring oscillator measurements according to examples of the present disclosure.

FIG. 23 shows a histogram of ring oscillator measurements according to examples of the present disclosure. As shown in FIG. 23, the ring oscillator measurements average of 128^2 samples per bin. The counting statistics noise is far smaller than the observed features. The fairly consistent speed of Stages 4 and 5 are noticeably slower and Stage 15 (aka 31) is both slower and faster, which may be results of a peculiar routing at the bottom of the ring oscillator.

In some examples, the design may need to sample the ring oscillator at 4 clock edges, which include the rising and falling edges of the reference clock and the rising and falling edges of the received clock. The two clocks are phase locked (and the same frequency). In some examples, the Xilinx slice flip-flops operate on a common clock and a common edge of that clock, needs 4 slices to sample each bit of the ring oscillator, and uses additional flip-flops in the slice for metastability resolution. The Xilinx may be needed for fast clocks, but may not be needed in other applications such as sampling at isolated strobe edges. In the Xilinx example, there are 8 flip-flops in each slice. In some examples, not all logic columns are the same and may differ in logic slices, memory slices, non-LUT features (BRAMs, DSPs, other), and other hardware artifacts. With regard to routing resources, the slice columns are in pairs with vertical routing between each pair, the horizontal routing may not run as fast, a few slice pins route well (i.e., fast), most do not, and columns are broken at the chip edges.

Figure 24:
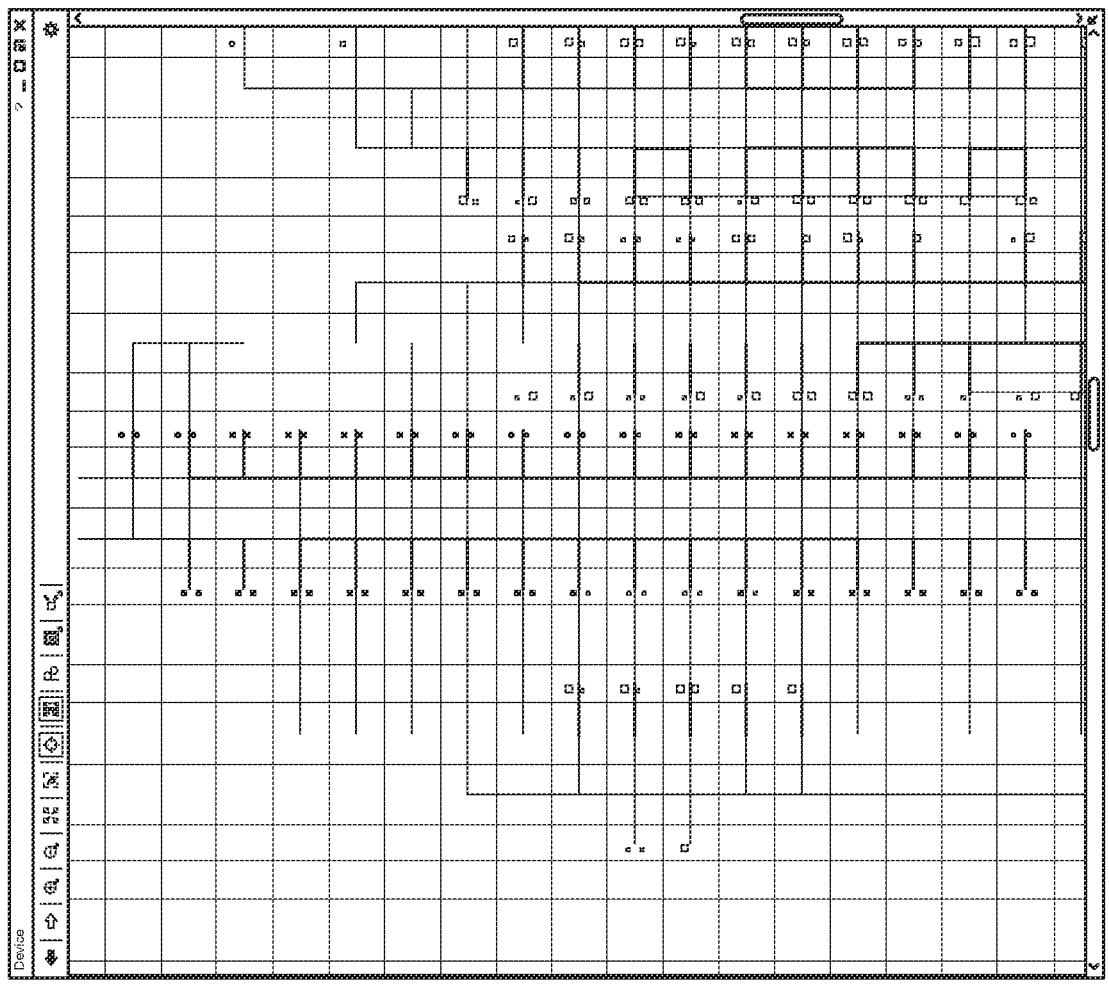
FIG. 24 shows Xilinx slice columns according to examples of the present disclosure.

FIG. 24 shows Xilinx slice columns according to examples of the present disclosure. As shown in FIG. 24, ring oscillator LUTs are shown in the cells, left column of LUT slices are CLBLL_L of type SLICEL, right column of LUT slices are CLBLL_R of type SLICEL, vertical routing between the two SLICEL columns is apparent. The following command can be used to see the columns of SLICELs:

select_objects [get_sites\
      -filter {SITE_TYPE=="SLICEL"}].

Figure 25:
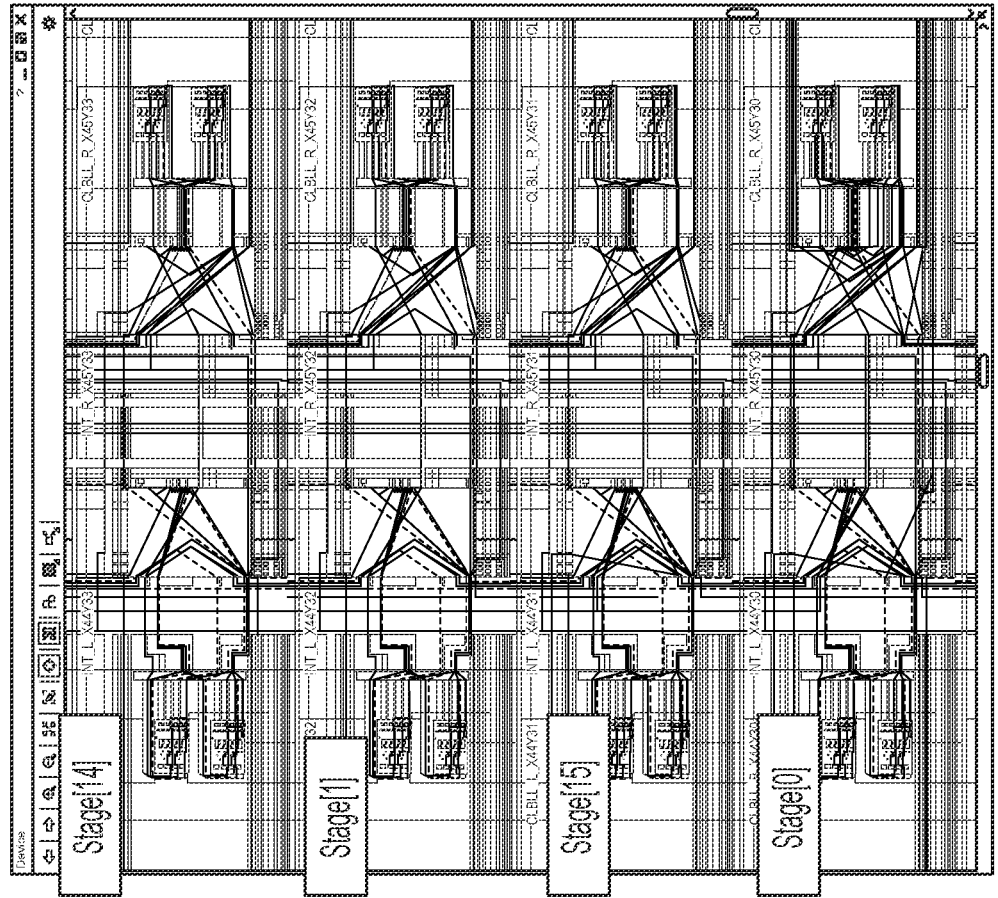
FIG. 25 shows a vertical LUT sequence according to examples of the present disclosure.

FIG. 25 shows a vertical LUT sequence according to examples of the present disclosure. In some examples, commanding the LUT and FF placement will correctly locate the hardware components, but will do so with a lot of other stuff close by. Route then fails or does poorly because of competing signals for the routing resources. The resolution is to configure them as "IS_ROUTE_FIXED" (in Xilinx FPGAs), rip up the placement (the routing will persist), perform placement (again). The results will be different since some of the signal routing is now specified and restricts placement of non-ring-oscillator components, perform routing (which now runs faster than before this procedure). There are then no timing violations.

Figure 27:
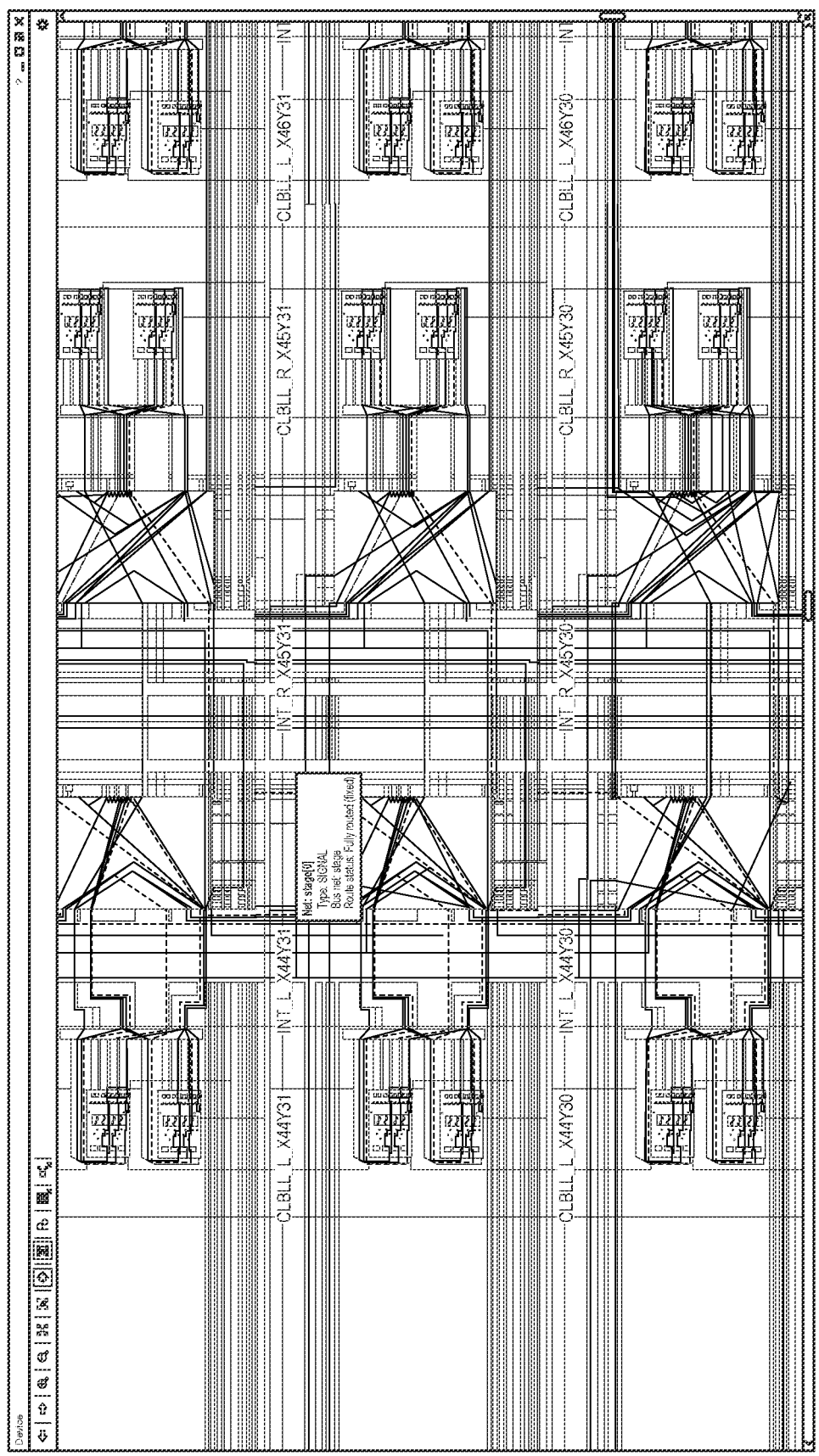
FIG. 27 shows routing results according to examples of the present disclosure.

FIG. 26 shows a TCL script that ensures consistent ring-oscillator routing in the Xilinx FPGA according to examples of the present disclosure. FIG. 27 shows routing results according to examples of the present disclosure. Ring oscillators tend to be lousy measurement instruments for a variety of reasons, including the speed changes as supply voltage or temperature changes, and the frequency wandering. Although Xilinx is described as one example FPGA, this is just one non-limiting example of a FPGA. Other suitable FPGA can be used.

Figure 28:
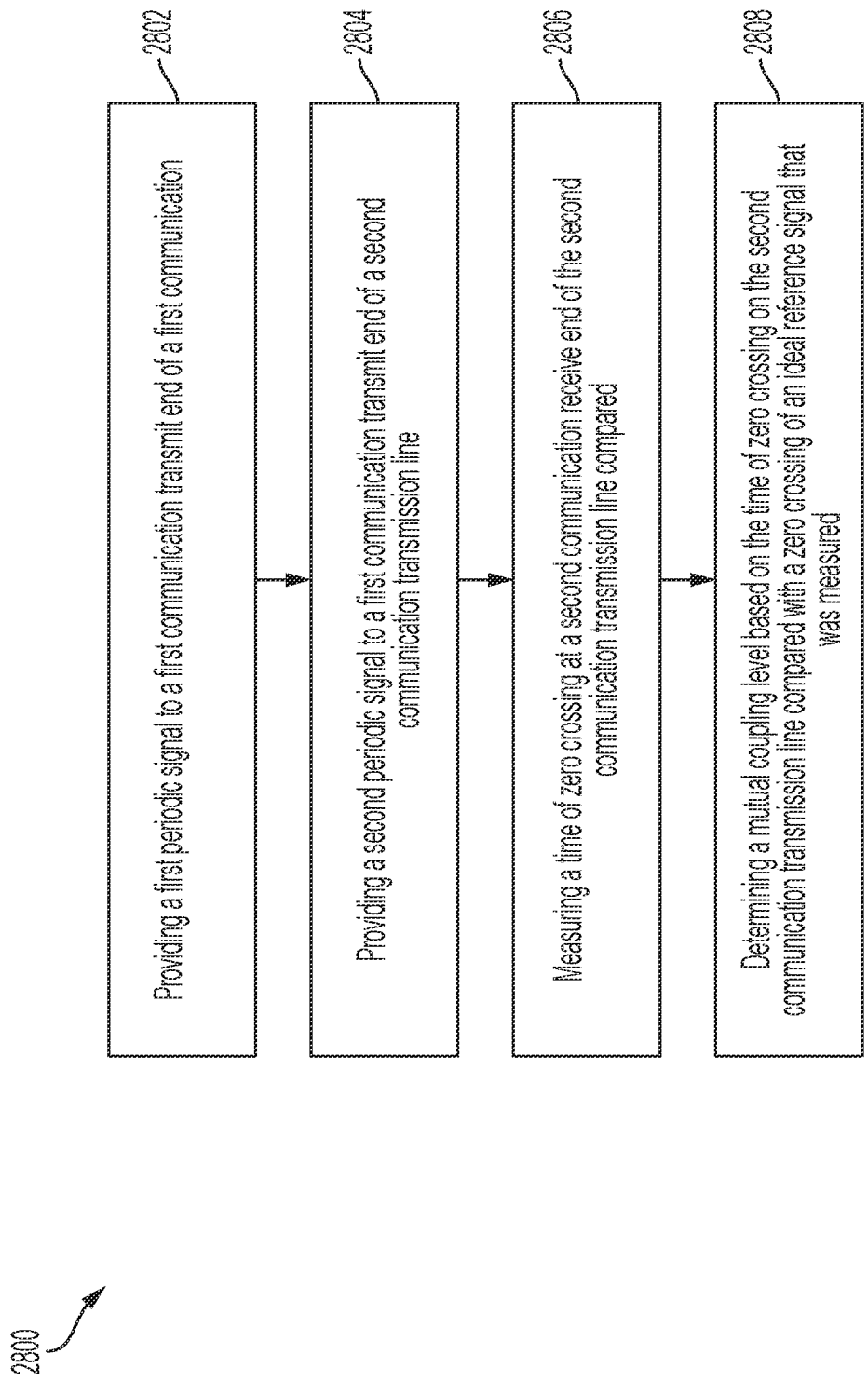
FIG. 28 shows a method for determining mutual coupling between adjacent communication transmission lines according to examples of the present disclosure.

FIG. 28 shows a method 2800 for determining mutual coupling between adjacent communication transmission lines according to examples of the present disclosure. Method 2800 comprises providing a first periodic signal to a first communication transmit end of a first communication transmission line, as in 2802. For example, the first communication transmission line is an aggressor line. For example, the first periodic signal is a pseudo-random noise signal and the first periodic signal can be provided using a digital buffer. Method 2800 continues by providing a second periodic signal to a second communication transmit end of a second communication transmission line, as in 2804. For example, the second communication transmission line is a victim line. For example, the second periodic signal is a clock signal or a square wave. The first communication transmission line is adjacent to the second communication transmission line. For example, the first communication transmission line is separated from the second communication transmission line by about 1 micron to about 1 millimeter. Method 2800 continues by measuring a time of zero-crossing at a second communication receive end of the second communication transmission line compared with a zero-crossing of an ideal reference signal, as in 2806. Method 2800 continues by determining a mutual coupling level based on the time of zero-crossing on the second communication transmission line compared with a zero-crossing of an ideal reference signal that was measured, as in 2808.

Figure 29:
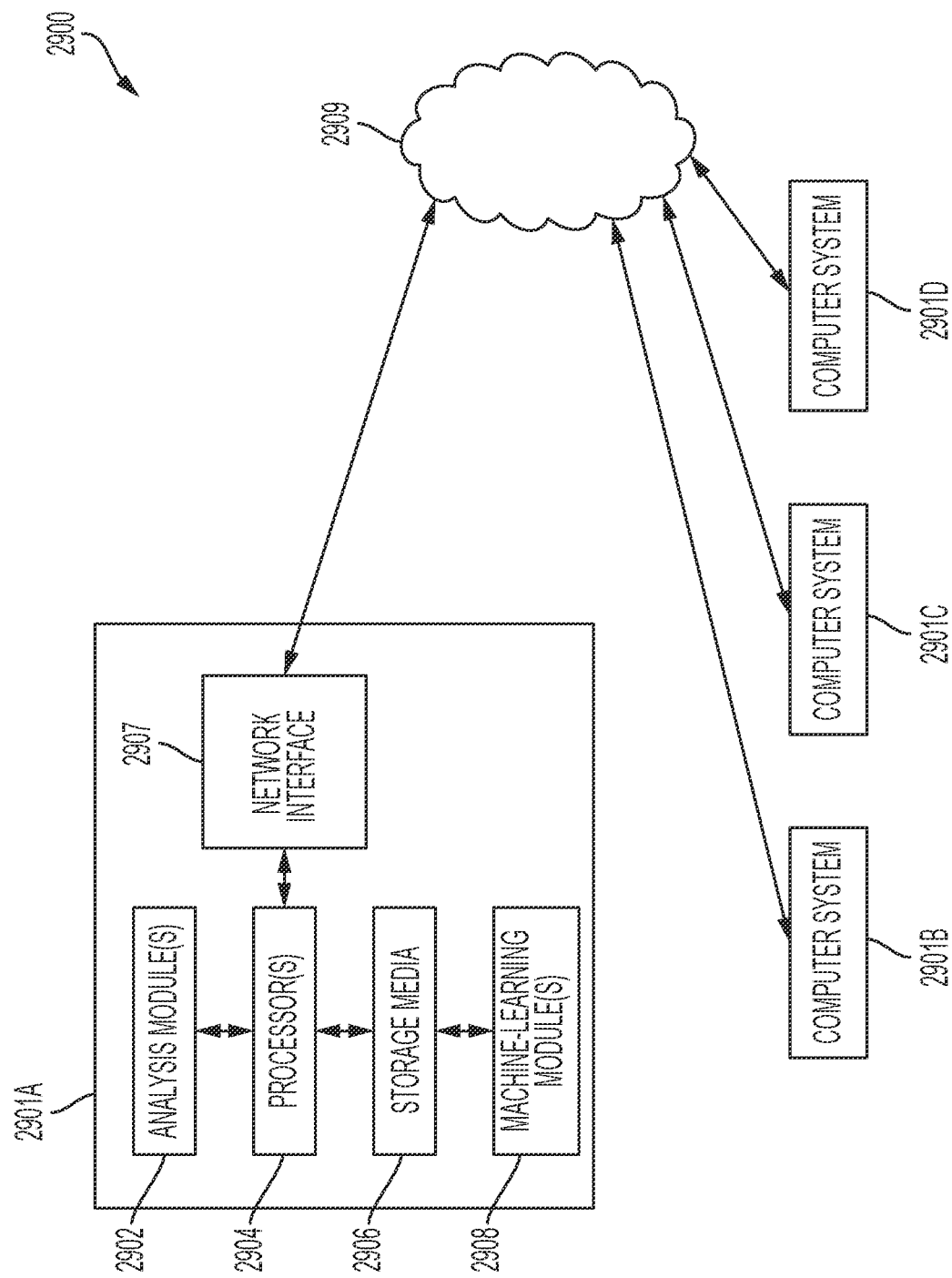
FIG. 29 illustrates an example of such a computing system, in accordance with some embodiments.

In some embodiments, any of the methods of the present disclosure may be executed by a computing system. FIG. 29 illustrates an example of such a computing system 2900, in accordance with some embodiments. The computing system 2900 may include a computer or computer system 2901A, which may be an individual computer system 2901A or an arrangement of distributed computer systems. The computer system 2901A includes one or more analysis module(s) 2902 configured to perform various tasks according to some embodiments, such as one or more methods disclosed herein. To perform these various tasks, the analysis module 2902 executes independently, or in coordination with, one or more hardware processors 2904, which is (or are) connected to one or more non-transitory computer readable medium 2906, such as a computer storage media. The hardware processor(s) 2904 is (or are) also connected to a network interface 2907 to allow the computer system 2901A to communicate over a data network 2909 with one or more additional computer systems and/or computing systems, such as 2901B, 2901C, and/or 2901D (note that computer systems 2901B, 2901C and/or 2901D may or may not share the same architecture as computer system 2901A, and may be located in different physical locations, e.g., computer systems 2901A and 2901B may be located in a processing facility, while in communication with one or more computer systems such as 2901C and/or 2901D that are located in one or more data centers, and/or located in varying countries on different continents).

A processor can include a microprocessor, microcontroller, processor module or subsystem, programmable integrated circuit, programmable gate array, or another control or computing device.

The non-transitory computer readable medium 2906 can be implemented as one or more computer-readable or machine-readable storage media. The non-transitory computer readable medium 2906 can be connected to or coupled with a machine learning module(s) 2908. Note that while in the example embodiment of FIG. 29 non-transitory computer readable medium 2906 is depicted as within computer system 2901A, in some embodiments, non-transitory computer readable medium 2906 may be distributed within and/or across multiple internal and/or external enclosures of computing system 2901A and/or additional computing systems. The non-transitory computer readable medium 2906 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLURAY® disks, or other types of optical storage, or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions or located at a remote site from which machine-readable instructions can be downloaded over a network for execution.

It should be appreciated that computer system 2900 (or computing system) is only one example of a computing system, and that computer system 2900 may have more or fewer components than shown, may combine additional components not depicted in the example embodiment of FIG. 29, and/or computer system 2900 may have a different configuration or arrangement of the components depicted in FIG. 29. The various components shown in FIG. 29 may be implemented in hardware, software, or a combination of both hardware and software, including one or more signal processing and/or application specific integrated circuits.

Further, the steps in the processing methods described herein may be implemented by running one or more functional modules in an information processing apparatus such as general purpose processors or application specific chips, such as ASICs, FPGAs, PLDs, or other appropriate devices. These modules, combinations of these modules, and/or their combination with general hardware are all included within the scope of protection of the invention.

Models and/or other interpretation aids may be refined in an iterative fashion; this concept is applicable to embodiments of the present methods discussed herein. This can include use of feedback loops executed on an algorithmic basis, such as at a computing device (e.g., computing system 2900, FIG. 29), and/or through manual control by a user who may make determinations regarding whether a given step, action, template, model, or set of curves has become sufficiently accurate for the evaluation of the signal(s) under consideration.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. Moreover, the order in which the elements of the methods are illustrated and described may be re-arranged, and/or two or more elements may occur simultaneously. The embodiments were chosen and described in order to best explain the principles of the invention and its practical applications, to thereby enable others skilled in the art to best utilize the invention and various embodiments with various modifications as are suited to the particular use contemplated.

4 Conclusion

An all digital method has been constructed to measure mutual coupling between high-speed digital communications links. Simulations demonstrate the method is viable and is able to measure couplings as small as −100 dBc. In some examples, the methods can be implemented using an FPGA with two O(1) Gbps I/Os.

Examples of the present disclosure can include one or more of the following clauses.

Clause 1 A method for determining mutual coupling between adjacent communication transmission lines, the method comprising:
  providing a first periodic signal to a first communication transmit end of a first communication transmission line;
  providing a second periodic signal to a second communication transmit end of a second communication transmission line, wherein the first communication transmission line is adjacent to the second communication transmission line;
  measuring a time of zero-crossing at a second communication receive end of the second communication transmission line compared with a zero-crossing of an ideal reference signal; and
  determining a mutual coupling level based on the time of zero-crossing on the second communication transmission line compared with a zero-crossing of an ideal reference signal that was measured.

Clause 2 The method of clause 1, wherein the first communication transmission line is an aggressor line.

Clause 3 The method of clause 1 or clause 2, wherein the second communication transmission line is a victim line.

Clause 4 The method of any of clauses 1-3, wherein the first periodic signal is a pseudo-random noise signal.

Clause 5 The method of any of clauses 1-4, wherein the first periodic signal is provided using a digital buffer.

Clause 6 The method of any of clauses 1-5, wherein the first communication transmission line is separated from the second communication transmission line by about 1 micron to about 1 millimeter.

Clause 7 The method of any of clauses 1-6, wherein the second periodic signal is
a clock signal or a square wave.

Clause 8 A computer system comprising:
a hardware processor;
a non-transitory computer readable medium that stores instructions that when executed by the hardware processor perform a method for determining mutual coupling between adjacent communication transmission lines, the method comprising:
  providing a first periodic signal to a first communication transmit end of a first communication transmission line;
  providing a second periodic signal to a second communication transmit end of a second communication transmission line, wherein the first communication transmission line is adjacent to the second communication transmission line;
  measuring a time of zero-crossing at a second communication receive end of the second communication transmission line compared with a zero-crossing of an ideal reference signal; and
  determining a mutual coupling level based on the time of zero-crossing on the second communication transmission line compared with a zero-crossing of an ideal reference signal that was measured.

Clause 9 The computer system of clause 8, wherein the first communication transmission line is an aggressor line.

Clause 10 The computer system of clause 8 or clause 9, wherein the second communication transmission line is a victim line.

Clause 11 The computer system of any of clauses 8-10, wherein the first periodic signal is a pseudo-random noise signal.

Clause 12 The computer system of any of clauses 8-11, wherein the first periodic signal is provided using a digital buffer.

Clause 13 The computer system of any of clauses 8-12, wherein the first communication transmission line is separated from the second communication transmission line by about 1 micron to about 1 millimeter.

Clause 14 The computer system of any of clauses 8-13, wherein the second periodic signal is a clock signal or a square wave.

Clause 15 A non-transitory computer readable medium that stores instructions that when executed by a hardware processor perform a method for determining mutual coupling between adjacent communication transmission lines, the method comprising:
  providing a first periodic signal to a first communication transmit end of a first communication transmission line;
  providing a second periodic signal to a second communication transmit end of a second communication transmission line, wherein the first communication transmission line is adjacent to the second communication transmission line;
  measuring a time of zero-crossing at a second communication receive end of the second communication transmission line compared with a zero-crossing of an ideal reference signal; and
  determining a mutual coupling level based on the time of zero-crossing on the second communication transmission line compared with a zero-crossing of an ideal reference signal that was measured.

Clause 16 The non-transitory computer readable medium of clause 15, wherein the first communication transmission line is an aggressor line.

Clause 17 The non-transitory computer readable medium of clause 15 or clause 16, wherein the second communication transmission line is a victim line.

Clause 18 The non-transitory computer readable medium of any of clauses 15-17, wherein the first periodic signal is a pseudo-random noise signal.

Clause 19 The non-transitory computer readable medium of any of clauses 15-18, wherein the first periodic signal is provided using a digital buffer.

Clause 20 The non-transitory computer readable medium of any of clauses 15-19, wherein the first communication transmission line is separated from the second communication transmission line by about 1 micron to about 1 millimeter.

REFERENCES

[1] Peterson, W. Wesley and Weldon, E. J., Jr, Error-Correcting Codes, Second Edition, The Massachusetts Institute of Technology Press, Cambridge, Massachusetts, 1972.

In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The foregoing description provides illustration and description, but is not intended to be exhaustive or to limit the possible implementations to the precise form disclosed. Modifications and variations are possible in light of the above disclosure or may be acquired from practice of the implementations.

It will be apparent that different examples of the description provided above may be implemented in many different forms of software, firmware, and hardware in the implementations illustrated in the figures. The actual software code or specialized control hardware used to implement these examples is not limiting of the implementations. Thus, the operation and behavior of these examples were described without reference to the specific software code—it being understood that software and control hardware can be designed to implement these examples based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

While the present disclosure has been disclosed with respect to a limited number of embodiments, those skilled in the art, having the benefit of this disclosure, will appreciate numerous modifications and variations there from. It is intended that the appended claims cover such modifications and variations as fall within the true spirit and scope of the disclosure.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

In one or more exemplary embodiments, the functions described can be implemented in hardware, software, firmware, or any combination thereof. For a software implementation, the techniques described herein can be implemented with modules (e.g., procedures, functions, subprograms, programs, routines, subroutines, modules, software packages, classes, and so on) that perform the functions described herein. A module can be coupled to another module or a hardware circuit by passing and/or receiving information, data, arguments, parameters, or memory contents. Information, arguments, parameters, data, or the like can be passed, forwarded, or transmitted using any suitable means including memory sharing, message passing, token passing, network transmission, and the like. The software codes can be stored in memory units and executed by processors. The memory unit can be implemented within the processor or external to the processor, in which case it can be communicatively coupled to the processor via various means as is known in the art.

In one or more exemplary embodiments, the functions described can be implemented in hardware, software, firmware, or any combination thereof. For a software implementation, the techniques described herein can be implemented with modules (e.g., procedures, functions, subprograms, programs, routines, subroutines, modules, software packages, classes, and so on) that perform the functions described herein. A module can be coupled to another module or a hardware circuit by passing and/or receiving information, data, arguments, parameters, or memory contents. Information, arguments, parameters, data, or the like can be passed, forwarded, or transmitted using any suitable means including memory sharing, message passing, token passing, network transmission, and the like. The software codes can be stored in memory units and executed by processors. The memory unit can be implemented within the processor or external to the processor, in which case it can be communicatively coupled to the processor via various means as is known in the art.

Notwithstanding that the numerical ranges and parameters setting forth the broad scope of the embodiments are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume negative values, e.g., −1, −2, −3, −10, −20, −30, etc.

The above-described embodiments are described for illustrative purposes only with reference to the figures. Those of skill in the art will appreciate that the following description is exemplary in nature, and that various modifications to the parameters set forth herein could be made without departing from the scope of the present embodiments. It is intended that the specification and examples be considered as examples only. The various embodiments are not necessarily mutually exclusive, as some embodiments can be combined with one or more other embodiments to form new embodiments. It will be understood that the structures depicted in the figures may include additional features not depicted for simplicity, while depicted structures may be removed or modified.

What is claimed is:

1. A method for determining mutual coupling between adjacent communication transmission lines, the method comprising:
   providing a first periodic signal to a first communication transmit end of a first communication transmission line;
   providing a second periodic signal to a second communication transmit end of a second communication transmission line, wherein the first communication transmission line is adjacent to the second communication transmission line;
   measuring a time of zero-crossing at a second communication receive end of the second communication transmission line compared with a zero-crossing of an ideal reference signal; and
   determining a mutual coupling level based on the time of zero-crossing on the second communication transmission line compared with the zero-crossing of the ideal reference signal that was measured.

2. The method of claim 1, wherein the first communication transmission line is an aggressor line.

3. The method of claim 1, wherein the second communication transmission line is a victim line.

4. The method of claim 1, wherein the first periodic signal is a pseudo-random noise signal.

5. The method of claim 1, wherein the first periodic signal is provided using a digital buffer.

6. The method of claim 1, wherein the first communication transmission line is separated from the second communication transmission line by about 1 micron to about 1 millimeter.

7. The method of claim 1, wherein the second periodic signal is a clock signal or a square wave.

8. A computer system comprising:
   a hardware processor;
   a non-transitory computer readable medium that stores instructions that when executed by the hardware processor perform a method for determining mutual coupling between adjacent communication transmission lines, the method comprising:
      providing a first periodic signal to a first communication transmit end of a first communication transmission line;
      providing a second periodic signal to a second communication transmit end of a second communication transmission line, wherein the first communication transmission line is adjacent to the second communication transmission line;
      measuring a time of zero-crossing at a second communication receive end of the second communication transmission line compared with a zero-crossing of an ideal reference signal; and
      determining a mutual coupling level based on the time of zero-crossing on the second communication transmission line compared with the zero-crossing of the ideal reference signal that was measured.

9. The computer system of claim 8, wherein the first communication transmission line is an aggressor line.

10. The computer system of claim 8, wherein the second communication transmission line is a victim line.

11. The computer system of claim 8, wherein the first periodic signal is a pseudo-random noise signal.

12. The computer system of claim 8, wherein the first periodic signal is provided using a digital buffer.

13. The computer system of claim 8, wherein the first communication transmission line is separated from the second communication transmission line by about 1 micron to about 1 millimeter.

14. The computer system of claim 8, wherein the second periodic signal is a clock signal or a square wave.

15. A non-transitory computer readable medium that stores instructions that when executed by a hardware processor perform a method for determining mutual coupling between adjacent communication transmission lines, the method comprising:
- providing a first periodic signal to a first communication transmit end of a first communication transmission line;
- providing a second periodic signal to a second communication transmit end of a second communication transmission line, wherein the first communication transmission line is adjacent to the second communication transmission line;
- measuring a time of zero-crossing at a second communication receive end of the second communication transmission line compared with a zero-crossing of an ideal reference signal; and
- determining a mutual coupling level based on the time of zero-crossing on the second communication transmission line compared with the zero-crossing of the ideal reference signal that was measured.

16. The non-transitory computer readable medium of claim 15, wherein the first communication transmission line is an aggressor line.

17. The non-transitory computer readable medium of claim 15, wherein the second communication transmission line is a victim line.

18. The non-transitory computer readable medium of claim 15, wherein the first periodic signal is a pseudo-random noise signal.

19. The non-transitory computer readable medium of claim 15, wherein the first periodic signal is provided using a digital buffer.

20. The non-transitory computer readable medium of claim 15, wherein the first communication transmission line is separated from the second communication transmission line by about 1 micron to about 1 millimeter.

* * * * *